(12) United States Patent
Gerhards et al.

(10) Patent No.: US 10,015,550 B2
(45) Date of Patent: Jul. 3, 2018

(54) MATRIX CODE-BASED USER INTERFACE

(71) Applicant: DISH Technologies L.L.C., Englewood, CO (US)

(72) Inventors: Keith Gerhards, Parker, CO (US); Dan J. Minnick, Littleton, CO (US); Kranti Kilaru, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 14/852,787

(22) Filed: Sep. 14, 2015

(65) Prior Publication Data

US 2016/0066050 A1    Mar. 3, 2016

Related U.S. Application Data

(62) Division of application No. 12/973,431, filed on Dec. 20, 2010, now Pat. No. 9,148,686.

(51) Int. Cl.
*H04N 21/472* (2011.01)
*H04N 21/41* (2011.01)
(Continued)

(52) U.S. Cl.
CPC ... *H04N 21/47214* (2013.01); *G06Q 30/0241* (2013.01); *H04N 21/4126* (2013.01);
(Continued)

(58) Field of Classification Search
CPC ......... H04N 21/47214; H04N 21/4126; H04N 21/4334; H04N 21/6543; H04N 21/6181
See application file for complete search history.

(56) References Cited

U.S. PATENT DOCUMENTS 4,809,325 A   2/1989   Hayashi et al.
4,837,414 A   6/1989   Edamula
(Continued)

FOREIGN PATENT DOCUMENTS

CA   2 634 951 A1   1/2010
CN   1352765 A     6/2002
(Continued)

OTHER PUBLICATIONS

Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
(Continued)

*Primary Examiner* — Pinkal R Chokshi
(74) *Attorney, Agent, or Firm* — Kilpatrick Townsend & Stockton, LLP

(57) ABSTRACT

A method for presenting a matrix code may include receiving, at a content receiver, a signal carrying identifying data relating to a remotely accessible program, generating, at a content receiver, a matrix code from the identifying data relating to the remotely accessible program, transmitting the matrix code as part of a content presentation to a presentation device for display, and receiving the remotely accessible program in response to a user capture of the matrix code. A method for remotely controlling a set top box and a method for setting a recording time on a set top box are also described. A method of preparing a program guide may include gathering program information, generating matrix codes for each program including program data, and associating the matrix codes with respective programs.

17 Claims, 7 Drawing Sheets

(51) Int. Cl.

| | | |
|---|---|---|
| *H04N 21/433* | (2011.01) | |
| *H04N 21/4722* | (2011.01) | |
| *H04N 21/61* | (2011.01) | |
| *H04N 21/6543* | (2011.01) | |
| *H04N 21/858* | (2011.01) | |
| *G06Q 30/02* | (2012.01) | |
| *H04N 21/236* | (2011.01) | |
| *H04N 7/08* | (2006.01) | |

(52) U.S. Cl.
CPC ..... *H04N 21/4334* (2013.01); *H04N 21/4722* (2013.01); *H04N 21/6181* (2013.01); *H04N 21/6543* (2013.01); *H04N 21/8586* (2013.01); *H04N 7/08* (2013.01); *H04N 21/23614* (2013.01)

(56) References Cited

U.S. PATENT DOCUMENTS

| | | | |
|---|---|---|---|
| 5,500,681 | A | 3/1996 | Jones |
| 5,510,603 | A | 4/1996 | Hess et al. |
| 5,581,636 | A | 12/1996 | Skinger |
| 5,602,377 | A | 2/1997 | Beller et al. |
| 5,703,349 | A | 12/1997 | Meyerson et al. |
| 5,929,849 | A | 7/1999 | Kikinis |
| 5,959,285 | A | 9/1999 | Schuessler |
| 5,963,265 | A | 10/1999 | Bae et al. |
| 5,978,855 | A | 11/1999 | Metz et al. |
| 6,006,990 | A | 12/1999 | Ye et al. |
| 6,058,238 | A | 5/2000 | Ng |
| 6,263,502 | B1 | 7/2001 | Morrison et al. |
| 6,438,751 | B1 | 8/2002 | Voyticky et al. |
| 6,512,919 | B2 | 1/2003 | Ogasawara |
| 6,556,273 | B1 | 4/2003 | Wheeler et al. |
| 6,704,929 | B1 | 3/2004 | Ozer et al. |
| 6,766,956 | B1 | 7/2004 | Boylan et al. |
| 6,983,304 | B2 | 1/2006 | Sato |
| 7,046,161 | B2 | 5/2006 | Hayes |
| 7,206,029 | B2 | 4/2007 | Cohen-Solal |
| 7,206,409 | B2 | 4/2007 | Antonellis et al. |
| 7,221,405 | B2 | 5/2007 | Basson et al. |
| 7,244,404 | B2 | 7/2007 | Rosenberg et al. |
| 7,328,848 | B2 | 2/2008 | Xia et al. |
| 7,349,668 | B2 | 3/2008 | Ilan et al. |
| 7,369,180 | B2 | 5/2008 | Xing |
| 7,373,652 | B1 | 5/2008 | Bayrakeri et al. |
| 7,387,250 | B2 | 6/2008 | Muni |
| 7,394,519 | B1 | 7/2008 | Mossman et al. |
| 7,424,976 | B2 | 9/2008 | Muramatsu |
| 7,443,449 | B2 | 10/2008 | Momosaki et al. |
| 7,487,527 | B2 | 2/2009 | Ellis et al. |
| 7,587,601 | B2 | 9/2009 | Levy et al. |
| 7,604,172 | B2 | 10/2009 | Onogi |
| 7,612,748 | B2 | 11/2009 | Tateuchi |
| 7,624,417 | B2 | 11/2009 | Dua |
| 7,624,916 | B2 | 12/2009 | Sato et al. |
| 7,673,297 | B1 | 3/2010 | Arsenault et al. |
| 7,797,430 | B2 | 9/2010 | Ichieda |
| 7,818,675 | B2 | 10/2010 | Maruyama et al. |
| 7,841,531 | B2 | 11/2010 | Onogi |
| 8,010,977 | B2 | 8/2011 | Hogyoku |
| 8,045,054 | B2 | 10/2011 | Bishop et al. |
| 8,186,572 | B2 | 5/2012 | Herzig |
| 8,292,166 | B2 | 10/2012 | Gomez et al. |
| 8,327,403 | B1* | 12/2012 | Chilvers ............ H04N 21/4334 725/104 |
| 8,364,018 | B2 | 1/2013 | McArdle |
| 8,380,993 | B2 | 2/2013 | Chen et al. |
| 8,386,339 | B2 | 2/2013 | Minnick et al. |
| 8,408,466 | B2 | 4/2013 | Gratton |
| 8,427,455 | B2 | 4/2013 | Matsuda |
| 8,430,302 | B2 | 4/2013 | Minnick et al. |
| 8,439,257 | B2 | 5/2013 | Beals et al. |
| 8,443,407 | B2 | 5/2013 | Gaede et al. |
| 8,468,610 | B2 | 6/2013 | Beals et al. |
| 8,511,540 | B2 | 8/2013 | Anguiano |
| 8,534,540 | B2 | 9/2013 | Gratton et al. |
| 8,550,334 | B2 | 10/2013 | Gratton et al. |
| 8,553,146 | B2 | 10/2013 | Kennedy |
| 8,640,956 | B2* | 2/2014 | Gomez ............... H04N 21/4126 235/375 |
| 8,746,554 | B2 | 6/2014 | Gomez et al. |
| 8,786,410 | B2 | 7/2014 | Beals et al. |
| 8,827,150 | B2 | 9/2014 | Gratton et al. |
| 8,833,640 | B2 | 9/2014 | Martch et al. |
| 8,856,853 | B2 | 10/2014 | Casagrande et al. |
| 8,875,173 | B2 | 10/2014 | Kilaru et al. |
| 8,886,172 | B2 | 11/2014 | Gomez |
| 8,931,031 | B2 | 1/2015 | Schaefer |
| 9,092,830 | B2 | 7/2015 | Gomez et al. |
| 9,148,686 | B2 | 9/2015 | Gerhards et al. |
| 9,280,515 | B2 | 3/2016 | Gaede et al. |
| 9,329,966 | B2 | 5/2016 | Dugan et al. |
| 9,367,669 | B2 | 6/2016 | Gratton |
| 9,571,888 | B2 | 2/2017 | Casagrande et al. |
| 9,596,500 | B2 | 3/2017 | Gomez et al. |
| 9,652,108 | B2 | 5/2017 | Mountain |
| 9,686,584 | B2 | 6/2017 | Gaede et al. |
| 9,736,469 | B2 | 8/2017 | Schaefer et al. |
| 9,781,465 | B2 | 10/2017 | Kilaru et al. |
| 9,792,612 | B2 | 10/2017 | Dugan et al. |
| 2001/0037297 | A1 | 11/2001 | McNair |
| 2001/0052133 | A1 | 12/2001 | Pack et al. |
| 2002/0011521 | A1 | 1/2002 | Lahey et al. |
| 2002/0027612 | A1 | 3/2002 | Brill et al. |
| 2002/0049980 | A1 | 4/2002 | Hoang |
| 2002/0065728 | A1 | 5/2002 | Ogasawara |
| 2002/0082931 | A1 | 6/2002 | Siegel et al. |
| 2002/0112250 | A1 | 8/2002 | Koplar et al. |
| 2002/0195495 | A1 | 12/2002 | Melick et al. |
| 2003/0018711 | A1 | 1/2003 | Imanishi |
| 2003/0050854 | A1 | 3/2003 | Showghi et al. |
| 2003/0077065 | A1 | 4/2003 | Scholten et al. |
| 2003/0112974 | A1 | 6/2003 | Levy |
| 2003/0121978 | A1 | 7/2003 | Rubin et al. |
| 2003/0125092 | A1 | 7/2003 | Burnhouse et al. |
| 2003/0151562 | A1 | 8/2003 | Kulas |
| 2003/0172374 | A1 | 9/2003 | Vinson et al. |
| 2004/0005900 | A1 | 1/2004 | Zilliacus |
| 2004/0019691 | A1 | 1/2004 | Daymond et al. |
| 2004/0026508 | A1 | 2/2004 | Nakajima et al. |
| 2004/0044532 | A1 | 3/2004 | Karstens |
| 2004/0046790 | A1 | 3/2004 | Agarwal et al. |
| 2004/0049672 | A1 | 3/2004 | Nollet et al. |
| 2004/0133907 | A1* | 7/2004 | Rodriguez ............ H04H 20/10 725/14 |
| 2004/0226042 | A1* | 11/2004 | Ellis .................. H04N 5/44543 725/43 |
| 2004/0260850 | A1 | 12/2004 | Yu et al. |
| 2005/0009564 | A1 | 1/2005 | Hayaashi et al. |
| 2005/0011958 | A1 | 1/2005 | Fukasawa et al. |
| 2005/0015800 | A1 | 1/2005 | Holcomb |
| 2005/0015815 | A1 | 1/2005 | Shoff et al. |
| 2005/0055281 | A1 | 3/2005 | Williams |
| 2005/0059339 | A1 | 3/2005 | Honda et al. |
| 2005/0097618 | A1 | 5/2005 | Arling et al. |
| 2005/0107135 | A1 | 5/2005 | Deeds et al. |
| 2005/0125301 | A1 | 6/2005 | Muni |
| 2005/0149967 | A1 | 7/2005 | Hanley et al. |
| 2005/0163483 | A1 | 7/2005 | Rassool |
| 2005/0180804 | A1 | 8/2005 | Andrew et al. |
| 2005/0203854 | A1 | 9/2005 | Das |
| 2005/0258250 | A1 | 11/2005 | Melick et al. |
| 2005/0262548 | A1 | 11/2005 | Shimojo et al. |
| 2005/0264694 | A1 | 12/2005 | Ilan et al. |
| 2006/0064700 | A1 | 3/2006 | Ludvig et al. |
| 2006/0065733 | A1 | 3/2006 | Lee et al. |
| 2006/0071076 | A1 | 4/2006 | Tamayama |
| 2006/0079247 | A1 | 4/2006 | Ritter |
| 2006/0086796 | A1 | 4/2006 | Onogi |
| 2006/0090179 | A1 | 4/2006 | Hsu et al. |
| 2006/0095286 | A1 | 5/2006 | Kimura |
| 2006/0124742 | A1 | 6/2006 | Rines et al. |

(56) References Cited

U.S. PATENT DOCUMENTS

| | | |
|---|---|---|
| 2006/0174317 A1 | 8/2006 | Onomatsu et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernethy et al. |
| 2007/0159522 A1 | 7/2007 | Neven |
| 2007/0174198 A1 | 7/2007 | Kasahara |
| 2007/0192723 A1 | 8/2007 | Anzelde et al. |
| 2007/0200335 A1 | 8/2007 | Tuschel |
| 2007/0205596 A1 | 9/2007 | Mizuno et al. |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0285944 A1* | 11/2008 | Tsunokawa ............... H04N 5/76 386/297 |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1* | 1/2009 | Hogyoku ............... G06Q 20/145 725/104 |
| 2009/0070699 A1 | 3/2009 | Birkill et al. |
| 2009/0083808 A1* | 3/2009 | Morrison ........... H04N 7/17336 725/87 |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li et al. |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0004984 A1* | 1/2010 | Beyabani ............... G06Q 30/02 705/14.1 |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0186025 A1* | 7/2010 | Thomas ............... G06F 3/0481 725/5 |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0083154 A1* | 4/2011 | Boersma ........... H04N 21/4334 725/109 |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1 | 12/2011 | Arya et al. |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |

(56) References Cited

U.S. PATENT DOCUMENTS

| | | |
|---|---|---|
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2017/0366806 A1 | 12/2017 | Schaefer et al. |
| 2018/0007415 A1 | 1/2018 | Kilaru et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |
| CN | 101 409 027 A | 4/2009 |
| CN | 101 873 467 A | 10/2010 |
| CN | 101 894 113 A | 11/2010 |
| CN | 101 895 722 A | 11/2010 |
| CN | 103221963 A | 7/2013 |
| DE | 23 36 711 A1 | 2/1975 |
| DE | 10 2007 038 810 A1 | 2/2009 |
| EM | 1 768 400 A2 | 3/2007 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 831 747 A1 | 9/2007 |
| EP | 2 079 051 A1 | 7/2009 |
| EP | 2 131 289 A1 | 12/2009 |
| EP | 2 439 936 A2 | 4/2012 |
| EP | 2 643 769 A1 | 10/2013 |
| EP | 2 643 793 A1 | 10/2013 |
| FR | 2 565 748 A1 | 12/1985 |
| FR | 2 929 467 A1 | 10/2009 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2000-222116 A | 8/2000 |
| JP | 2002-215768 A | 8/2002 |
| JP | 3929450 | 6/2007 |
| JP | 2007-213548 A | 8/2007 |
| JP | 2008028583 A * | 2/2008 |
| JP | 2008-244556 A | 10/2008 |
| JP | 2008-276716 | 11/2008 |
| JP | 2009-140204 A | 6/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 9/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2004/019442 A2 | 3/2004 |
| WO | 2005/109338 A1 | 11/2005 |
| WO | 2007/009005 A1 | 1/2007 |
| WO | 2009/056897 A1 | 5/2009 |
| WO | 2009/057651 A1 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 2012/071176 A1 | 5/2012 |
| WO | 2012071174 A1 | 5/2012 |

OTHER PUBLICATIONS

"Android App Reviews & Showcase Just a Tapp Away," Android Tapp, 10pp. Found online at http://www.androidtapp.com/download-the-weather-channel-android-app-from-your-tv/, Oct. 22, 2010.

O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.

"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Byford, D., "Universal Interactive Device," International Business Machines Corporation, Jun. 1998, 1 page.

Costedio, K., "Bluefly QR Codes Debut on TV," 2 pp. Found online at http://www.barcode.com/Mobile-Barcode-news/bluefly-qr-codes-debut-on-tv.html, Oct. 22, 2010.

First Examination Report from European Patent Office dated May 18, 2015 for EP 11849496.2, 7 pages.

Extended European Search Report for EP 12152690.9 dated Jun. 19, 2012, 9 pages.

European Office Action for EP 12716751.8 dated Nov. 11, 2015, 4 pages.

Extended European Search Report for EP 11842890.3 dated Mar. 26, 2014, 8 pages.

European Office Action for EP 11842890.3 dated Mar. 13, 2015, 8 pages.

Extended European Search Report for EP 11850819.1 dated Mar. 17, 2014, 5 pages.

(56) References Cited

OTHER PUBLICATIONS

Office Action for EP 11850819.1 dated Nov. 12, 2015, 4 pages.
Extended European Search Report for EP 11846486 dated Mar. 26, 2014, 5 pages.
Extended European Search Report for EP 11852630 dated Jun. 30, 2014, 7 pages.
Office Action from European Patent Office for Application No. 11852630.0 dated May 12, 2015, 7 pages.
European Search Report for EP 11844504 dated Feb. 24, 2015, 10 pages.
European Search Report for EP 11855065 dated Mar. 6, 2014, 6 pages.
Office Action for EP 11855065 dated Mar. 13, 2015, 6 pages.
First Office Action by the Mexican Institute of Industrial Property for Mexican Patent Application No. MX/a/2013/009881 dated Aug. 14, 2014, 3 pages.
Notice of Allowance by the Mexican Institute of Industrial Property for Mexican Patent Application No. MX/a/2013/009881 dated Jan. 12, 2015, 1 page.
Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
International Search Report and Written Opinion of PCT/US2011/059977 dated Mar. 19, 2012, 7 pages.
International Preliminary Report on Patentability of PCT/US2011/059977 dated Jun. 6, 2013, 6 pages.
International Preliminary Report on Patentability of PCT/US2012/048032 dated Apr. 3, 2014, 6 pages.
International Search Report and Written Opinion of PCT/US11/60002 dated Feb. 15, 2012, 7 pages.
International Preliminary Report on Patentability for PCT/US2011/060002 dated Jun. 6, 2013, 6 pages.
International Search Report and Written Opinion of PCT/US11/60094 dated Mar. 30, 2012, 7 pages.
International Preliminary Report on Patentability for PCT/US2011/060094 dated Jun. 20, 2013, 6 pages.
International Search Report and Written Opinion of PCT/US11/60104 dated Mar. 29, 2012, 9 pages.
International Search Report and Written Opinion of PCT/US2011/60121 dated Feb. 14, 2012, 7 pages.
International Preliminary Report on Patentability for PCT/US2011/060121 dated Jun. 20, 2013, 6 pages.
International Search Report and Written Opinion of PCT/US11/61074 dated Jan. 6, 2012, 11 pages.
International Search Report and Written Opinion of PCT/US11/61211 dated on Mar. 29, 2012, 8 pages.
International Preliminary Report on Patentability for PCT/US2011/061211 dated Jul. 4, 2013, 7 pages.
International Search Report and Written Opinion of PCT/US11/61773 dated Feb. 21, 2012, 7 pages.
International Preliminary Report on Patentability for PCT/US2011/061773 dated Jun. 6, 2013, 6 pages.
International Search Report and Written Opinion of PCT/US11/61778 dated Mar. 2, 2012, 7 pages.
International Preliminary Report on Patentability for PCT/US2011/061778 dated Jul. 11, 2013, 6 pages.
International Search Report and Written Opinion of PCT/US11/63111 dated Apr. 4, 2012, 9 pages.
International Preliminary Report on Patentability of PCT/US2011/063111 dated Jun. 13, 2013, 8 pages.
International Search Report and Written Opinion of PCT/US2011/064709 dated Apr. 10, 2012, 8 pages.
International Search Report and Written Opinion of PCT/US2011/060098 dated Mar. 29, 2012, 10 pages.
International Preliminary Report on Patentability for PCT/US2011/060098 dated Jun. 13, 2013, 9 pages.
International Search Report and Written Opinion of PCT/US2011/063308 dated Mar. 29, 2012, 10 pages.
International Preliminary Report on Patentability for PCT/US2011/063308 dated Jul. 18, 2013, 9 pages.
International Search Report and Written Opinion of PCT/US2011/068161 dated Jun. 14, 2012, 19 pages.
International Preliminary Report on Patentability of PCT/US2011/068161 dated Jul. 25, 2013, 13 pages.
International Search Report and Written Opinion of PCT/US2011/068176 dated Mar. 29, 2012, 15 pages.
International Search Report and Written Opinion of PCT/US2012/021657 dated May 23, 2012, 12 pages.
International Search Report of PCT/US2012/022581 dated Oct. 8, 2012, 18 pages.
International Preliminary Report on Patentability for PCT/US2012/022581 dated Aug. 8, 2013, 12 pages.
International Search Report and Written Opinion of PCT/US2012/022405 dated Apr. 19, 2012, 11 pages.
International Preliminary Report on Patentability for PCT/US2012/022405 dated Aug. 8, 2013, 7 pages.
International Search Report and Written Opinion of PCT/US2012/024923 dated May 22, 2012, 12 pages.
International Preliminary Report on Patentability for PCT/US2012/024923 dated Aug. 29, 2013, 8 pages.
International Search Report and Written Opinion of PCT/US2012/024956 dated Jun. 11, 2012, 10 pages.
International Preliminary Report on Patentability for PCT/US2012/024956 dated Aug. 29, 2013, 7 pages.
International Search Report and Written Opinion of PCT/US2012/025502 dated Jun. 8, 2012, 13 pages.
International Preliminary Report on Patentability of PCT/US2012/025502 dated Sep. 6, 2013, 9 pages.
International Search Report and Written Opinion of PCT/US2012/025607 dated Jun. 8, 2012, 13 pages.
International Preliminary Report on Patentability for PCT/US2012/025607 dated Sep. 12, 2013, 8 pages.
International Search Report and Written Opinion of PCT/US2012/025634 dated May 7, 2012, 8 pages.
International Preliminary Report on Patentability for PCT/US2012/025634 dated Sep. 6, 2013, 5 pages.
International Search Report and Written Opinion of PCT/US2012/026373 dated Jun. 13, 2012, 14 pages.
International Preliminary Report on Patentability for PCT/US2012/026373 dated Sep. 12, 2013, 10 pages.
International Search Report and Written Opinion of PCT/US2012/026624 dated Aug. 29, 2012, 14 pages.
International Preliminary Report on Patentability for PCT/US2012/026624 dated Sep. 12, 2013, 12 pages.
International Search Report and Written Opinion of PCT/US2012/026722 dated Jun. 28, 2012, 11 pages.
International Search Report and Written Opinion of PCT/US2012/048032, dated Oct. 16, 2012, 14 pages.
International Search Report and Written Opinion of PCT/US2011/060109 dated Feb. 14, 2012, 7 pages.
International Preliminary Report on Patentability for PCT/US2011/060109 dated Jun. 20, 2013, 7 pages.
First Examination Report from European Patent Office dated Feb. 4, 2015 for EP 12716751.8, 4 pages.
First Office Action for CN 201180065044.7 dated Feb. 13, 2015 by the State Intellectual Property Office (SIPO), 4 pages.
Second Office Action for CN 201180065044.7 dated Sep. 9, 2015 by the State Intellectual Property Office (SIPO), 23 pages.
Office Action from European Patent Office for Application No. 12716728.6 dated Feb. 26, 2015, 5 pages.
Notice of Allowance and search report for ROC (Taiwan) Patent Application No. 101106288 dated May 29, 2015, 9 pages.
Office Action of the Intellectual Property Office for ROC Patent App. No. 101101486 dated Aug. 5, 2014, 4 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
Office Action from State Intellectual Property Office for CN Appln. No. 201180056242.7 dated Jun. 17, 2015, 10 pages.

(56) References Cited

OTHER PUBLICATIONS

U.S. Appl. No. 13/968,611, filed Aug. 16, 2013, Notice of Allowance dated May 2, 2014, 40 pages.
The First Office Action dated Sep. 11, 2014 for Mexican Patent Application No. MX/a/2013/007672 is not translated into English, 2 pages.
The Second Office Action dated Jun. 1, 2015 for Mexican Patent Application No. MX/a/2013/007672 is not translated into English, 2 pages.
The First Office Action dated Jul. 13, 2015 for Mexican Patent Application No. MX/a/2013/009791 is not translated into English, 2 pages.
Office Action dated Nov. 12, 2014 for Mexican Patent Application No. MX/a/2013/009794, 2 pages.
Notice of Allowance dated Feb. 18, 2015 for Mexican Patent Application No. MX/a/2013/009794, 1 page.
The First Office Action for Mexican Patent Application No. MX/a/2013/006262 is not translated into English. This document is from prosecution of the corresponding foreign matter for which we do not have a translation. Dated Aug. 7, 2014, 2 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Jan. 28, 2015 for Mexican Patent Application No. MX/a/2013/006973, 9 pages.
Notice of Allowance for Mexican Patent Application No. MX/a/2013/006973 dated Sep. 4, 2015, 1 page.
Office Action dated Dec. 5, 2014 for Mexican Patent Application No. MX/a/2013/009882, 2 pages.
The Second Office Action dated Apr. 22, 2015 for Mexican Patent Application No. MX/a/2013/009883, 2 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefiy.html?src=busin, Oct. 22, 2010.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/gr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.

Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerxist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
Office Action and Search Report from the State Intellectual Property Office for CN Pat. Appln. No. 201180066584.7 dated Jul. 10, 2015, 12 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100149344 dated Jan. 23, 2015, 8 pages.
Search Report for Patent Application ROC (Taiwan) Patent Application No. 100149344 dated Oct. 28, 2015, 1 page.
Office Action and Search Report for ROC (Taiwan) Patent Application No. 100142966 dated May 27, 2014, 6 pages.
Office Action for European Patent Application No. 12707435.9 dated Mar. 12, 2015, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014, Non-Final Office Action dated May 22, 2014, 14 pages.
U.S. Appl. No. 14/179,336, filed Feb. 12, 2014 Final Office Action dated Dec. 1, 2014, 30 pages.
U.S. Appl. No. 14/179,336, filed Feb. 12, 2014 Notice of Allowance dated Feb. 18, 2015, 15 pages.
U.S. Appl. No. 13/302,717, filed Nov. 22, 2011 Non Final Rejection dated Dec. 2, 2015, 27 pages.
U.S. Appl. No. 13/302,717, filed Nov. 22, 2011 Final Rejection dated May 8, 2015, 44 pages.
U.S. Appl. No. 13/302,717, filed Nov. 22, 2011 Non-Final Rejection dated Dec. 18, 2014, 71 pages.
U.S. Appl. No. 12/958,073, filed Dec. 1, 2010, Office Action dated Aug. 31, 2012, 12 pages.
U.S. Appl. No. 12/958,073, filed Dec. 1, 2010, Notice of Allowance dated Jan. 17, 2013, 17 pages.
U.S. Appl. No. 12/961,369, filed Dec. 6, 2010, Non-Final Office Action dated Mar. 9, 2012, 17 pages.
U.S. Appl. No. 12/964,478, filed Dec. 9, 2010, Non-Final Office Action dated Mar. 26, 2013, 19 pages.
U.S. Appl. No. 12/964,478, filed Dec. 9, 2010, Final Office Action dated Sep. 16, 2013, 12 pages.
U.S. Appl. No. 12/971,349, filed Dec. 17, 2010, Office Action dated Nov. 10, 2011, 9 pages.
U.S. Appl. No. 12/971,349, filed Dec. 17, 2010, Final Office Action dated Jan. 20, 2012, 10 pages.
U.S. Appl. No. 12/961,369, filed Dec. 6, 2010, Notice of Allowance dated Jul. 16, 2014, 15 pages.
U.S. Appl. No. 12/961,369, filed Dec. 6, 2010, Final Rejection dated Oct. 30, 2012, 17 pages.
U.S. Appl. No. 12/961,369, filed Dec. 6, 2010, Non-Final Office Action dated Mar. 25, 2013, 17 pages.
U.S. Appl. No. 12/961,369, filed Dec. 6, 2010, Non-Final Office Action dated Jul. 12, 2013, 22 pages.
U.S. Appl. No. 12/961,369, filed Dec. 6, 2010, Non-Final Office Action dated Feb. 13, 2014, 21 pages.
U.S. Appl. No. 12/971,349, filed Dec. 7, 2010, Notice of Allowance dated Oct. 2, 2013, 24 pages.
U.S. Appl. No. 12/971,349, filed Dec. 7, 2010, Final Rejection dated Oct. 24, 2012, 11 pages.
U.S. Appl. No. 12/971,349, filed Dec. 17, 2010, Office Action dated Jul. 16, 2012, 11 pages.
U.S. Appl. No. 12/981,244, filed Dec. 29, 2010, Office Action dated Dec. 21, 2012, 23 pages.
U.S. Appl. No. 12/981,244, filed Dec. 29, 2010, Final Office Action dated Oct. 30, 2013, 10 pages.

(56) References Cited

OTHER PUBLICATIONS

U.S. Appl. No. 12/981,244, filed Dec. 29, 2010, Notice of Allowance dated Mar. 25, 2014, 17 pages.
U.S. Appl. No. 12/984,385, filed Jan. 4, 2011, Notice of Allowance dated Nov. 28, 2012, 11 pages.
U.S. Appl. No. 12/984,385, filed Jan. 4, 2011), Office Action dated Jul. 12, 2012, 16 pages.
U.S. Appl. No. 12/986,721, filed Jan. 7, 2011, Office Action dated Mar. 16, 2012, 6 pages.
U.S. Appl. No. 12/986,721, filed Jan. 7, 2011, Notice of Allowance dated Jun. 21, 2012, 7 pages.
U.S. Appl. No. 12/953,227, filed Nov. 23, 2010, Final Office Action dated May 24, 2013, 17 pages.
U.S. Appl. No. 12/953,227, filed Nov. 23, 2010, Office Action dated Oct. 7, 2012, 31 pages.
U.S. Appl. No. 12/953,227, filed Nov. 23, 2010, Non Final Office action dated Mar. 24, 2015, 39 pages.
U.S. Appl. No. 12/953,227, filed Nov. 23, 2010, Final Office Action dated Nov. 6, 2015, 26 pages.
U.S. Appl. No. 13/015,382, filed Jan. 27, 2011, Office Action dated Nov. 13, 2012, 7 pages.
U.S. Appl. No. 13/015,382, filed Jan. 27, 2011, Notice of Allowance dated Feb. 22, 2013, 12 pages.
U.S. Appl. No. 13/016,483, filed Jan. 28, 2011 Office Action dated Nov. 2, 2012, 18 pages.
U.S. Appl. No. 13/016,483, filed Jan. 28, 2011 Final Office Action dated Jun. 27, 2013, 13 pages.
U.S. Appl. No. 13/016,483, filed Jan. 28, 2011 Non-Final Office Action dated Nov. 3, 2014, 33 pages.
U.S. Appl. No. 13/016,483, filed Jan. 28, 2011 Final Office Action dated May 13, 2015, 34 pages.
U.S. Appl. No. 13/016,483, filed Jan. 28, 2011 Non-Final Office Action dated Dec. 14, 2015, 27 pages.
U.S. Appl. No. 13/035,474, filed Feb. 25, 2011 Non Final Rejection dated Feb. 17, 2015, 57 pages.
U.S. Appl. No. 12/953,273, filed Nov. 23, 2010, Notice of Allowance, dated Oct. 18, 2012, 11 pages.
U.S. Appl. No. 12/965,645, filed Dec. 10, 2010, Non-Final Office Action, dated Jul. 19, 2013, 20 pages.
U.S. Appl. No. 12/965,645, filed Dec. 10, 2010, Final Office Action, dated Mar. 18, 2014, 24 pages.
U.S. Appl. No. 12/965,645, filed Dec. 10, 2010, Notice of Allowance, dated Jun. 20, 2014, 35 pages.
U.S. Appl. No. 12/973,431, filed Dec. 20, 2010, Non-Final Rejection dated May 15, 2013, 30 pages.
U.S. Appl. No. 12/973,431, filed Dec. 20, 2010, Final Office Action dated Aug. 27, 2013, 11 pages.
U.S. Appl. No. 12/973,431, filed Dec. 20, 2010 Non-Final Rejection dated Dec. 19, 2014, 30 pages.
U.S. Appl. No. 12/973,431, filed Dec. 20, 2010 Notice of Allowance dated May 28, 2015, 20 pages.
U.S. Appl. No. 13/007,317, filed Jan. 14, 2011, Office action dated Dec. 19, 2012, 29 pages.
U.S. Appl. No. 13/010,557, filed Jan. 20, 2011, Final Rejection dated Jan. 16, 2014, 17 pages.
U.S. Appl. No. 13/010,557, filed Jan. 20, 2011, Non-Final Rejection dated Aug. 5, 2013, 17 pages.
U.S. Appl. No. 13/014,591, Notice of Allowance dated May 24, 2013, 32 pages.
U.S. Appl. No. 13/020,678, filed Feb. 3, 2011, Office Action dated Jul. 30, 2012, 15 pages.
U.S. Appl. No. 13/020,678, filed Feb. 3, 2011, Notice of Allowance dated Jan. 3, 2013, 13 pages.
U.S. Appl. No. 13/007,317, Notice of Allowance dated May 13, 2013, 16 pages.
U.S. Appl. No. 13/028,030, filed Feb. 15, 2011, Office Action dated Jan. 11, 2013, 14 pages.
U.S. Appl. No. 13/028,030, filed Feb. 15, 2011, Final Office Action dated Jul. 11, 2014, 43 pages.
U.S. Appl. No. 13/028,030, filed Feb. 15, 2011, Non-Final Office Action dated Feb. 6, 2015, 56 pages.
U.S. Appl. No. 13/028,030, filed Feb. 15, 2011, Final Office Action dated Jul. 17, 2015, 63 pages.
U.S. Appl. No. 13/031,115, Notice of Allowance dated Apr. 16, 2013, 24 pages.
U.S. Appl. No. 13/034,482, filed Feb. 24, 2011 Notice of Allowance dated Aug. 29, 2014, 45 pages.
U.S. Appl. No. 13/034,482, filed Feb. 24, 2011, Final Office Action dated Apr. 25, 2013, 19 pages.
U.S. Appl. No. 13/034,482, filed Feb. 24, 2011, Office Action dated Oct. 19, 2012, 11 pages.
U.S. Appl. No. 13/035,474, filed Feb. 25, 2011, Office Action dated Oct. 30, 2012, 11 pages.
U.S. Appl. No. 13/035,474, filed Feb. 25, 2011, Final Rejection dated Mar. 29, 2013, 20 pages.
U.S. Appl. No. 13/035,474, filed Feb. 25, 2011, Non Final Rejection dated Mar. 6, 2014, 20 pages.
U.S. Appl. No. 13/035,474, filed Feb. 25, 2011 Final Rejection dated Aug. 27, 2014, 38 pages.
U.S. Appl. No. 13/035,474, filed Feb. 25, 2011 Non Final Rejection dated Sep. 11, 2015, 65 pages.
U.S. Appl. No. 12/960,285, filed Dec. 3, 2010 Non-Final Office Action dated May 14, 2015, 21 pages.
U.S. Appl. No. 12/960,285, filed Dec. 3, 2010 Final Office Action dated Dec. 3, 2014, 19 pages.
U.S. Appl. No. 12/960,285, filed Dec. 3, 2010, Non-Final Office Action dated Jun. 6, 2014, 19 pages.
U.S. Appl. No. 12/960,285, filed Dec. 3, 2010, Final Office Action dated Apr. 18, 2013, 14 pages.
U.S. Appl. No. 12/960,285, filed Dec. 3, 2010, Non-Final Office Action dated Dec. 6, 2012, 17 pages.
U.S. Appl. No. 12/960,285, filed Dec. 3, 2010, Notice of Allowance dated Nov. 18, 2015, 31 pages.
U.S. Appl. No. 13/006,270, filed Jan. 13, 2011, Non-Final Office Action dated Oct. 8, 2013, 20 pages.
U.S. Appl. No. 13/006,270, filed Jan. 13, 2011, Final Office Action dated May 9, 2014, 41 pages.
U.S. Appl. No. 13/006,270, filed Jan. 13, 2011 Non-Final Office Action dated Sep. 12, 2014, 41 pages.
U.S. Appl. No. 13/006,270, filed Jan. 13, 2011, Final Office Action dated Mar. 23, 2014, 51 pages.
U.S. Appl. No. 13/028,030, filed Feb. 15, 2011 Non-Final Office Action dated Dec. 17, 2013, 60 pages.
U.S. Appl. No. 13/035,525, filed Feb. 25, 2011, Office Action dated Jul. 18, 2012, 15 pages.
U.S. Appl. No. 13/035,525, filed Feb. 25, 2011, Final Office Action dated Jan. 31, 2013, 26 pages.
U.S. Appl. No. 13/035,525, filed Feb. 25, 2011, Non-Final Office Action dated May 15, 2013, 15 pages.
U.S. Appl. No. 13/035,525, filed Feb. 25, 2011, Final Office Action dated Sep. 12, 2013, 21 pages.
U.S. Appl. No. 13/037,302, filed Feb. 28, 2011, Office Action dated Mar. 1, 2013, 20 pages.
U.S. Appl. No. 13/037,302, filed Feb. 28, 2011, Final Office Action dated Oct. 16, 2013, 28 pages.
U.S. Appl. No. 13/037,302, filed Feb. 28, 2011, Final Office Action dated May 4, 2015, 54 pages.
U.S. Appl. No. 13/037,312, filed Feb. 28, 2011, Office Action dated Aug. 15, 2012, 9 pages.
U.S. Appl. No. 13/037,312, filed Feb. 28, 2011, Notice of Allowance dated Jun. 13, 2013, 10 pages.
U.S. Appl. No. 13/037,312, filed Feb. 28, 2011, Final Office Action dated Feb. 28, 2013, 18 pages.
U.S. Appl. No. 13/037,316, filed Feb. 28, 2011, Office Action dated Jan. 30, 2013, 21 pages.
U.S. Appl. No. 13/037,316, filed Feb. 28, 2011, Final Office Action dated Aug. 28, 2013, 13 pages.
U.S. Appl. No. 13/037,333, filed Feb. 28, 2011, Notice of Allowance dated Jan. 18, 2013, 27 pages.
U.S. Appl. No. 13/192,287, filed Jul. 27, 2011, Notice of Allowance dated Dec. 14, 2015, 14 pages.

(56) References Cited

OTHER PUBLICATIONS

U.S. Appl. No. 13/192,287, filed Jul. 27, 2011, Final Office Action dated Jan. 28, 2014, 18 pages.
U.S. Appl. No. 13/192,287, filed Jul. 27, 2011, Non Final Office Action dated Jun. 13, 2013, 22 pages.
U.S. Appl. No. 13/673,480, filed Nov. 9, 2012, Office Action dated Jan. 16, 2013, 27 pages.
U.S. Appl. No. 13/673,480, filed Nov. 9, 2012 Final Office Action dated Sep. 9, 2013, 10 pages.
U.S. Appl. No. 13/673,480, filed Nov. 9, 2012 Notice of Allowance dated Nov. 12, 2013, 16 pages.
U.S. Appl. No. 13/475,794, filed May 18, 2012 Non-Final Office Action dated Sep. 18, 2013, 19 pages.
U.S. Appl. No. 13/475,794, filed May 18, 2012 Non-Final Office Action dated Nov. 21, 2014, 33 pages.
U.S. Appl. No. 13/475,794, filed May 18, 2012 Final Office Action dated Jun. 1, 2015, 45 pages.
U.S. Appl. No. 13/864,474, filed Apr. 17, 2013 Non Final Office Action dated Aug. 11, 2015, 59 pages.
U.S. Appl. No. 13/864,474, filed Apr. 17, 2013 Final Office Action dated Nov. 20, 2015, all pages.
Examination Search Report from the European Patent Office dated Dec. 4, 2015 for EP 12707418.5, 8 pages.
First Office Action with Search Report for CN 201280013891.3 dated Jan. 15, 2016, 3 pages.
Notice of Allowance dated Nov. 10, 2015 for Mexican Patent Application No. MX/a/2013/007672, 1 page.
Second Office Action issued by State Intellectual Property Office for CN Pat. Appln. No. 201180066584.7 dated Jan. 11, 2016, 5 pages.
U.S. Appl. No. 13/037,302, filed Feb. 28, 2011, Non-Final Office Action dated Jan. 12, 2016, 62 pages.
First Office Action and Search Report from State Intellectual Property Office for CN Appln. No. 201180064527.5 dated Oct. 23, 2015, 10 pages.
Second Office Action from State Intellectual Property Office for CN Appln. No. 201180056242.7 dated Jan. 26, 2016, 9 pages.
First Office Action and Search Report from the State Intellectual Property Office (SIPO) for CN 201180056249.9 dated Feb. 3, 2016, 7 pages.
First Office Action for CN 201280010873 dated Mar. 2, 2016, 14 pages.
U.S. Appl. No. 13/864,474, filed Apr. 17, 2013 Non Final Office Action dated Mar. 23, 2016, all pages.
European Office Action for EP 11842890.3 dated May 9, 2016, all pages.
Notice of Allowance for Mexican Patent Application No. MX/a/2013/009791 dated Mar. 15, 2016, 1 page.
Office Action for European Patent App. 12704473.3 dated Apr. 29, 2016, all pages.
Supplementary European Search Report for EP 11843423 dated Mar. 23, 2016, 8 pages.
Supplementary European Search Report for EP 11843045 dated Mar. 31, 2016, all pages.
First Office Action including Search Report from the State Intellectual Property Office for CN Patent Appln. No. 201280014034.5 dated Apr. 5, 2016, all pages.
Office Action and Search Report for ROC (Taiwan) Pat. Appln. No. 101106313 dated May 12, 2016, all pages.
Notice of Decision to Grant for CN 201280010873 dated Mar. 25, 2016, all pages.
Office Action for Korean Patent Application No. 10-2013-7015610 dated Oct. 21, 2016, all pages. (no English translation available).
Office Action for EP 11811502.1 dated Aug. 29, 2016, all pages.
Publication of Brazil appln No. BR 11 2013 012218-8 on Aug. 9, 2016, 1 page.
Second Office Action CN 201280013891.3 dated Aug. 12, 2016, all pages.

Office Action dated Oct. 17, 2016 for European Patent Appln. No. 12701638.4, all pages.
Office Action for EP 12705768.5 dated May 25, 2016, all pages.
Third Office Action from State Intellectual Property Office for CN Appln. No. 201180056242.7 dated Jul. 28, 2016, all pages.
Second Office Action from State Intellectual Property Office for CN Appln. No. 201180064527.5 dated Jun. 12, 2016, all pages.
U.S. Appl. No. 13/302,717, filed Nov. 22, 2011 Non Final Rejection dated Jun. 16, 2016, all pages.
U.S. Appl. No. 13/016,483, filed Jan. 28, 2011 Final Office Action dated Jul. 5, 2016, all pages.
U.S. Appl. No. 13/037,302, filed Feb. 28, 2011, Final Office Action dated Jul. 12, 2016, all pages.
U.S. Appl. No. 13/475,794, filed May 18, 2012 Non Final Office Action dated Jul. 29, 2016, all pages.
Notice of Allowance for Canadian Application 2,818,585 dated Apr. 3, 2017, 1 page.
Notice of Allowance for Canadian Application 2,828,463 dated Apr. 4, 2017, 1 page.
Office Action for CA 2,818,585 dated Nov. 28, 2016, all pages.
(Translation) Rejection Decision for CN Appln. No. 201180064527.5 dated Oct. 9, 2016, all pages.
Notice of Decision to Grant for KR 10-2013-7024307 dated Apr. 14, 2017, 2 pages.
Second Office Action issued by State Intellectual Property Office (SIPO) for CN 201180056249.9 dated Feb. 4, 2017, all pages.
Office Action for Korean Patent Application No. 10-2013-7020207 dated Dec. 21, 2016, all pages.
Decision to Grant for Korean Patent Application No. 10-2013-7020207 dated Mar. 9, 2017, all pages.
Office Action and Search Report for ROC (Taiwan) Pat. Appln. No. 101106313 dated Nov. 4, 2016, all pages.
Notice of Allowance for Canadian Application 2,822,214 dated Nov. 28, 2016, 1 page.
U.S. Appl. No. 12/953,227, filed Nov. 23, 2010, Notice of Allowance dated May 9, 2017, all pages.
U.S. Appl. No. 13/037,302, filed Feb. 28, 2011, Notice of Allowance dated Feb. 16, 2017, all pages.
U.S. Appl. No. 13/475,794, filed May 18, 2012 Notice of Allowance dated Jan. 5, 2017, all pages.
U.S. Appl. No. 13/864,474, filed Apr. 17, 2013 Notice of Allowance dated Feb. 16, 2017, all pages.
Office Action for Korean Patent Application No. 10-2013-7015610 dated Feb. 21, 2017, all pages.
Office Action for CA 2,823,636 dated Jan. 24, 2017, all pages.
Office Action for CA 2,825,414 dated Apr. 3, 2017, all pages.
Office Action for CA 2,825,414 dated Nov. 1, 2017, all pages.
First Examination Report for EP Appln No. 12716110.7 dated Aug. 2, 2017, all pages.
First Office Action for CA Appln No. 2828447 dated Sep. 7, 2017, all pages.
Office Action for CA 2,818,757 dated Jul. 12, 2017, all pages.
Office Action for CA 2,818,604 dated Aug. 3, 2017, all pages.
Third Office Action issued by State Intellectual Property Office (SIPO) for CN 201180056249.9 dated Aug. 21, 2017, all pages.
U.S. Appl. No. 15/595,621, filed May 15, 2017 Non-Final Rejection dated Oct. 18, 2017, all pages.
European Search Report for EP 11 846 858.6 dated Jun. 12, 2017, all pages.
Office Action for EP 11844504 dated Mar. 13, 2017, all pages.
Third Office Action from State Intellectual Property Office for CN Appln. No. CN 201280013891.3 dated Dec. 30, 2016, all pages.
Office Action dated Mar. 2, 2017 for KR 10-2013-7020865, all pages.
Notice to Grant dated Jun. 9, 2017 for KR 10-2013-7020865, all pages.
Publication of BR 11 2014 020007-6 A2 dated Jun. 20, 2017, 1 page.

\* cited by examiner

US 10,015,550 B2

MATRIX CODE-BASED USER INTERFACE

RELATED APPLICATIONS

The present application also claims priority to and is a divisional application of U.S. patent application Ser. No. 12/973,431, filed Dec. 20, 2010, entitled "MATRIX CODE-BASED USER INTERFACE," the entire contents of which are incorporated herein by reference for all purposes.

FIELD OF THE INVENTION

The present disclosure relates generally to an interface for television programming. More particularly, the present disclosure relates to QR codes presented on a display for scanning, where the codes have audiovisual program information stored therein.

BRIEF SUMMARY OF THE INVENTION

In one embodiment, a method for presenting a matrix code for expressing an interest in a remotely accessible program may include receiving, at a content receiver, a signal carrying identifying data relating to the remotely accessible program. The method may also include generating, at the content receiver, a matrix code from the identifying data relating to the remotely accessible program. The method may also include transmitting the matrix code as part of a content presentation to a presentation device for display. The method may further include receiving the remotely accessible program in response to a user capture of the matrix code. The method may be part of a process including scanning the matrix code, communicating with a service provider, and scheduling and downloading the remotely accessible program.

In one embodiment, a method for presenting a matrix code for expressing an interest in a remotely accessible program may include receiving, at a content receiver, a signal carrying identifying data relating to the remotely accessible program. The method may also include generating, at the content receiver, a matrix code from the identifying data relating to the remotely accessible program. The method may also include transmitting the matrix code as part of a content presentation to a presentation device for display. The method may further include receiving the remotely accessible program in response to a user capture of the matrix code. The method may be part of a process including scanning the matrix code, communicating with a service provider, and scheduling and downloading the remotely accessible program.

In another embodiment, a method of setting a recording time on a set top box may include receiving an instruction to record from a service provider, coordinating the recording time with previously scheduled recordings, and setting the set top box to record.

In still another embodiment, a method of preparing a program guide may include gathering program information, generating matrix codes for each program including program data, and associating the matrix codes with respective programs.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE INVENTION

Figure 1:
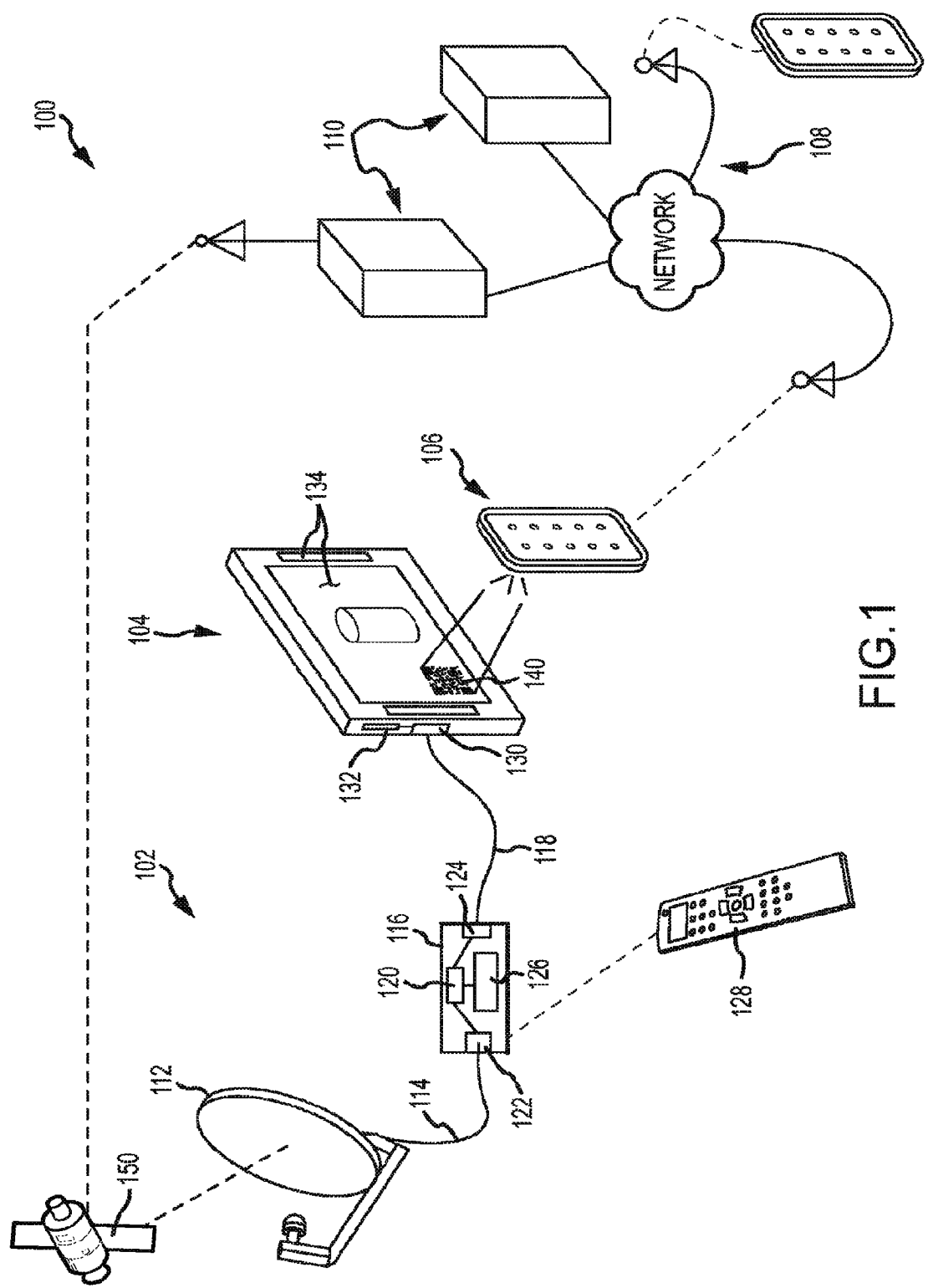
FIG. 1 is a diagram illustrating a system for transmitting audiovisual content and for supporting upstream communication from a user to a television service provider, according to certain embodiments.

The description that follows includes sample systems and methods that embody various elements of the present disclosure. However, it should be understood that the described disclosure may be practiced in a variety of forms in addition to those described herein.

Audiovisual programming generally involves transmitting signals carrying audiovisual content to a receiver. Generally, the audiovisual content includes streams of data supporting several viewable programs at any given time. As such, the signals may be processed and the audiovisual content may be selectively displayed on a presentation device by, for example, selecting a particular channel. Although a receiver may not be set to a particular channel, it receives data for several channels. In this manner, service providers may allow users to have flexibility in what they watch without requiring that the user communicate information to the service provider. However, in the case of pay-per-view, video-on-demand, and other types of viewing, it can be beneficial for the user to be able to communicate with the provider. In some cases, for example, a satellite set top box may be connected to a phone line to order pay-per-view movies, shows, or events. In other cases, a set top box may have an Internet connection. In these cases, the phone line or Internet connection may allow the user to communicate upstream to the television service provider and initiate changes to the audiovisual content available to them.

The present disclosure relates to systems and methods for communicating with a television provider as well as methods associated with modifying and/or scheduling the viewing or storing of audiovisual content. In some embodiments, the system includes a satellite configured to receive transmissions and instructions from a satellite provider.

The methods, in some embodiments, involve producing a matrix code, such as a QR code, and associating the matrix code with programming promoting audiovisual content that is remotely accessible. That is, the programming may include an advertisement, the audiovisual content may be a TV show or movie, and the audio visual content may be remotely accessible from a service provider via on-demand programming, for example. A user may scan the code using, for example, a smartphone when viewing the advertisement. The code may include information and instructions for a smartphone to communicate with the satellite service provider to schedule the download of the advertised TV show or movie to the user's set top box for later on-demand viewing. In other embodiments, the code may include information and instructions for their smartphone to communicate with the satellite service provider to unlock or otherwise release controls on a pay-per-view channel, out-of-package channel, or other channel for immediate viewing. In another embodiment, a QR code may be produced and associated with a television program. The QR code may be viewable in an electronic program guide and may be visually associated with the television program. In this embodiment, a user may scan the code when viewing the program guide. The code may include information and instructions for a smartphone, or other reader device, to communicate with the television service provider to, in turn, send an instruction to the user's set top box to schedule a recording of the television program. Other embodiments and variations of those mentioned will be described below.

Referring now to FIG. 1, a sample system 100 for performing the methods described herein is shown. As shown, the system 100 may include a receiver 102 for receiving audiovisual programs and instructions from a service provider. The system 100 may also include a presentation device 104 for displaying the programs. The system 100 may also include a reader 106 for reading information displayed on the presentation device 104, typically in the form of a matrix code 140. The reader may be in communication with a network 108 supported by one or more servers 110 for processing the information captured from presentation device 104.

The receiver 102 may be configured to receive a signal carrying a broadcast television program, a program guide, a menu, a movie or other audiovisual content. The receiver 102 may further be configured for transmitting the content to the presentation device 104 for viewing. As such, the receiver 102 may be in the form of a set top box 116 or a satellite system as shown including a dish 112, cabling 114 leading to the set top box 116, and cabling 118 leading to the presentation device 104, for example. Other examples of a receiver 102 may include an antenna system employing an analog or digital antenna connected by cabling leading either to a television receiver or directly to the presentation device 104. Still other examples may include a cable system including an incoming cable leading directly to a presentation device 104 or to a presentation device via a set top box.

In some embodiments, the receiver 102 may be configured to convert, configure, or otherwise modify the display prior to transmitting it to the presentation device for viewing. The receiver may further be configured for storing and displaying audiovisual content. The receiver may thus be in the form of a computer-type device having one or more processing units 120, one or more inputs 122, one or more outputs 124, and one or more computer readable storage media 126 (which may take the form of, but is not limited to: a magnetic storage medium; optical storage medium; magneto-optical storage medium; read only memory; random access memory; erasable programmable memory; flash memory; non-transitory storage media; and so on).

In some embodiments, these computer-type elements may be incorporated into a set top box 116 for receiving a broadcast, program guide information, audio and video streams, other audiovisual content, or other information. The set top box 116 may receive the information through the one or more inputs 122, process or store the incoming information, and selectively output information to the presentation device 104 for viewing and interaction by a viewer. For example, the viewer may select which television channel they would like to watch, select from time-shifted television programs stored in the storage medium, or select movies from a video-on-demand menu, for example. In another example, the viewer may navigate an electronic program guide or other series of menus, which may be output to the presentation device 104. Instructions executed by the processor 120 may be stored in the storage medium 126 or received through the one or more inputs 122 or both. The set top box 120 may include a remote control 128 for remote interaction with the viewer.

The presentation device 104 may include one or more inputs 130 for receiving information from the receiver and an electronic device 132 for receiving information from the one or more inputs 130 and transmitting the information to a display screen, speaker, or other output 134. The presentation device 104 may be a television, computer monitor, or other device for presenting a viewer with visual and/or audio stimuli.

The reader 106 may be a remote device configured for optically scanning information from the presentation device 104. The reader 106, like the receiver 102 described above, may also be a computer-type device having one or more inputs, a processor, a computer readable storage medium, and one or more outputs. One of the inputs of the reader 106 may include an optical receiver configured for receiving and recording light patterns. The optical receiver may be a digital optical receiver similar to that found in digital cameras and some mobile phones. In some embodiments, the reader 106 may be in the form of a personal digital assistant (PDA), a portable computing device, a tablet computer, a smartphone and the like. The reader 106 may receive image input, for example, from the optical receiver and the processor may access processing instructions for the image from the computer readable storage medium. That is, in some embodiments, the reader 106 may have decoding software stored in the storage medium for decoding matrix codes. In some embodiments, the software may include an auto run feature when a matrix code is scanned. The processor may process the image produced by the optical receiver and may follow additional instructions produced by the processing of the image.

The reader 106 may have Internet access capability via a wireless telephone network, hardwired connection, WiFi access, or another network connection. In following instructions provided by the storage medium or, for example, from a processed image, the reader 106 may access the Internet or other network 108 and conduct additional activities by interacting with web-based systems 110 or other network connected systems 110.

The network connected systems or servers 110 may include web servers connected to a network (e.g., the Internet) for supporting web sites or other web interfaces. The network connected systems or servers 110 may also include the computers, systems, or servers of a television service provider. For example, the receiver 102 may be configured to receive information via satellite from the server 110 of a respective television service provider. As such, a full-circle system of information transfer may be provided, as shown best in FIG. 1.

Figure 2A:
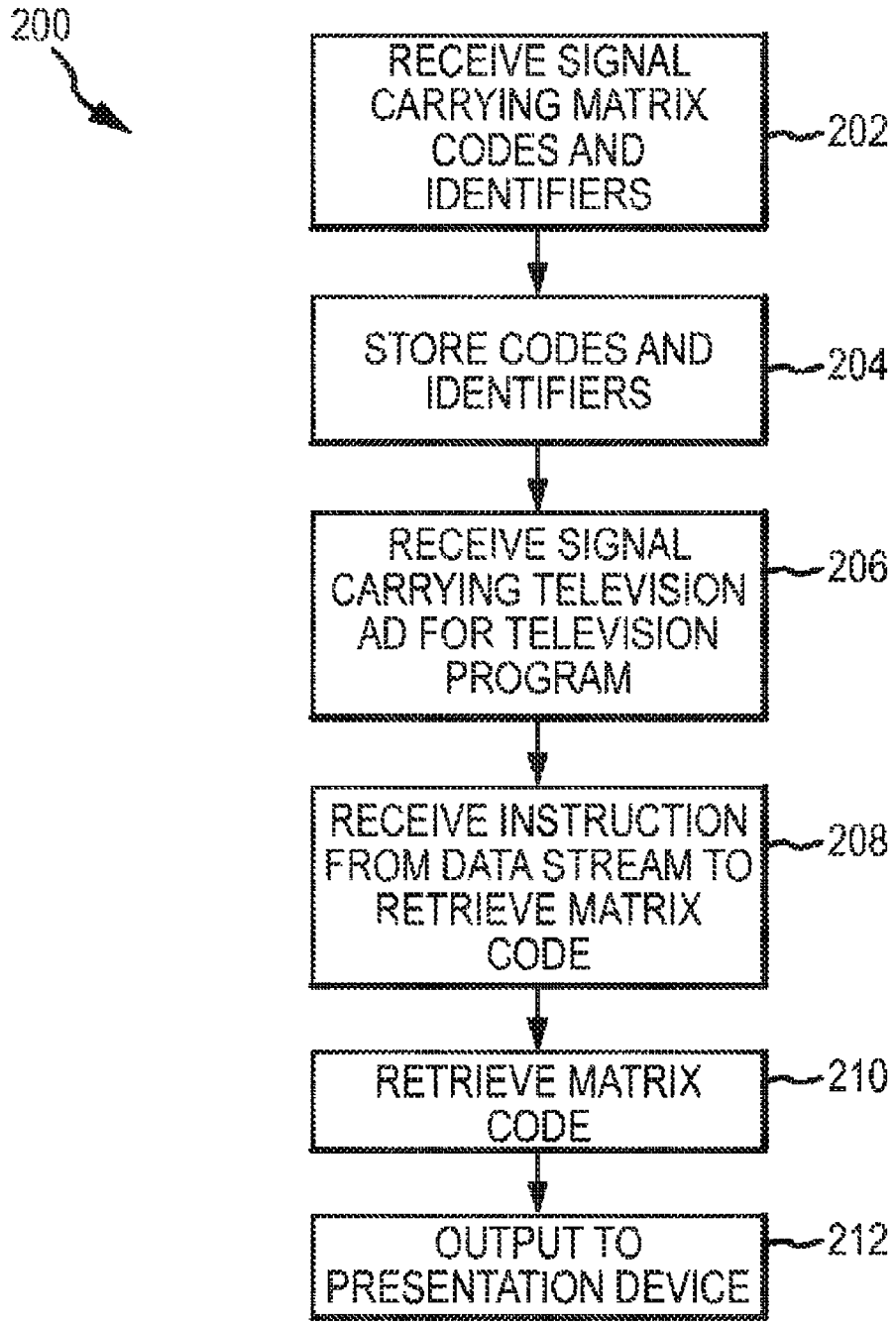
FIG. 2A is a flow chart illustrating a method for presenting a matrix code for expressing an interest in an on-demand program.
Figure 2B:
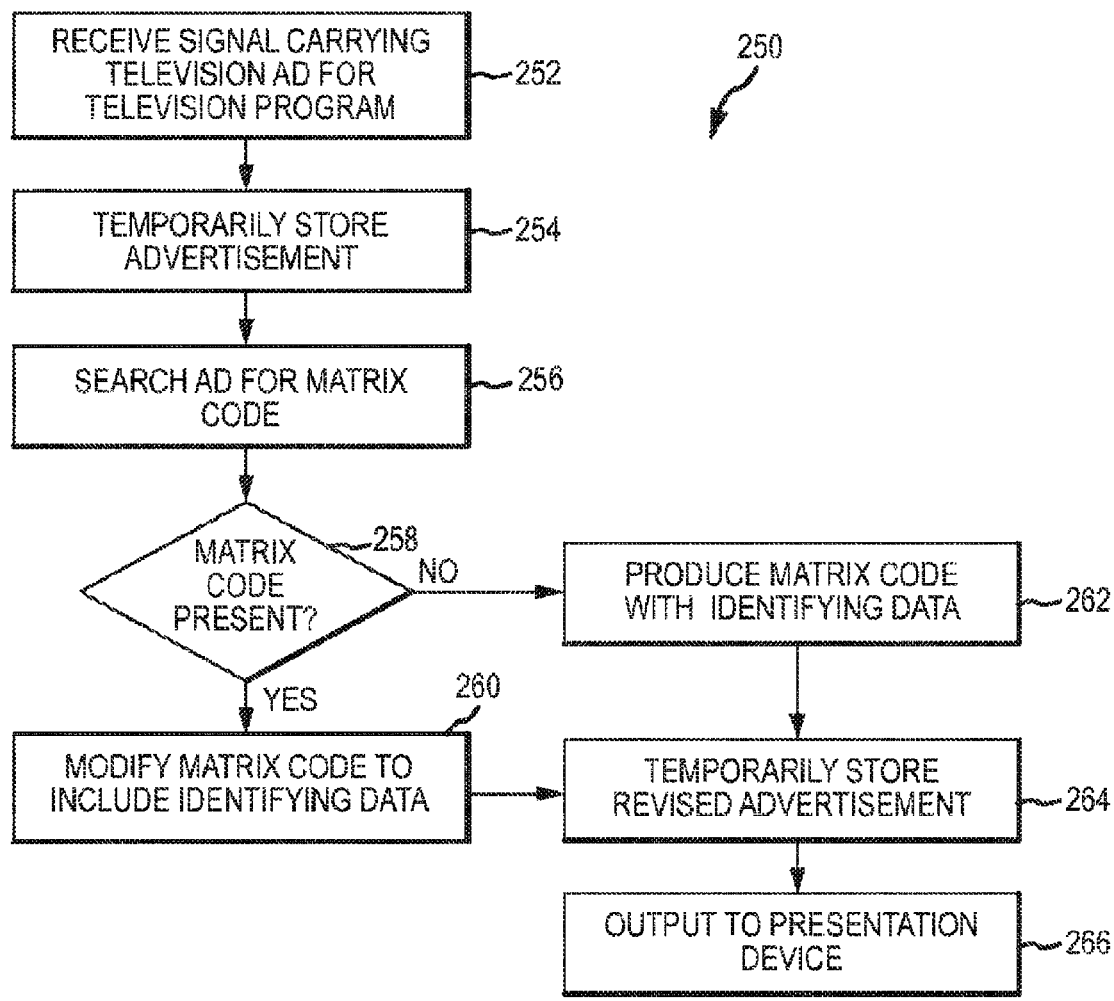
FIG. 2B is a flow chart illustrating an alternative method for presenting a matrix code for expressing an interest in an on-demand program.
Figure 3:
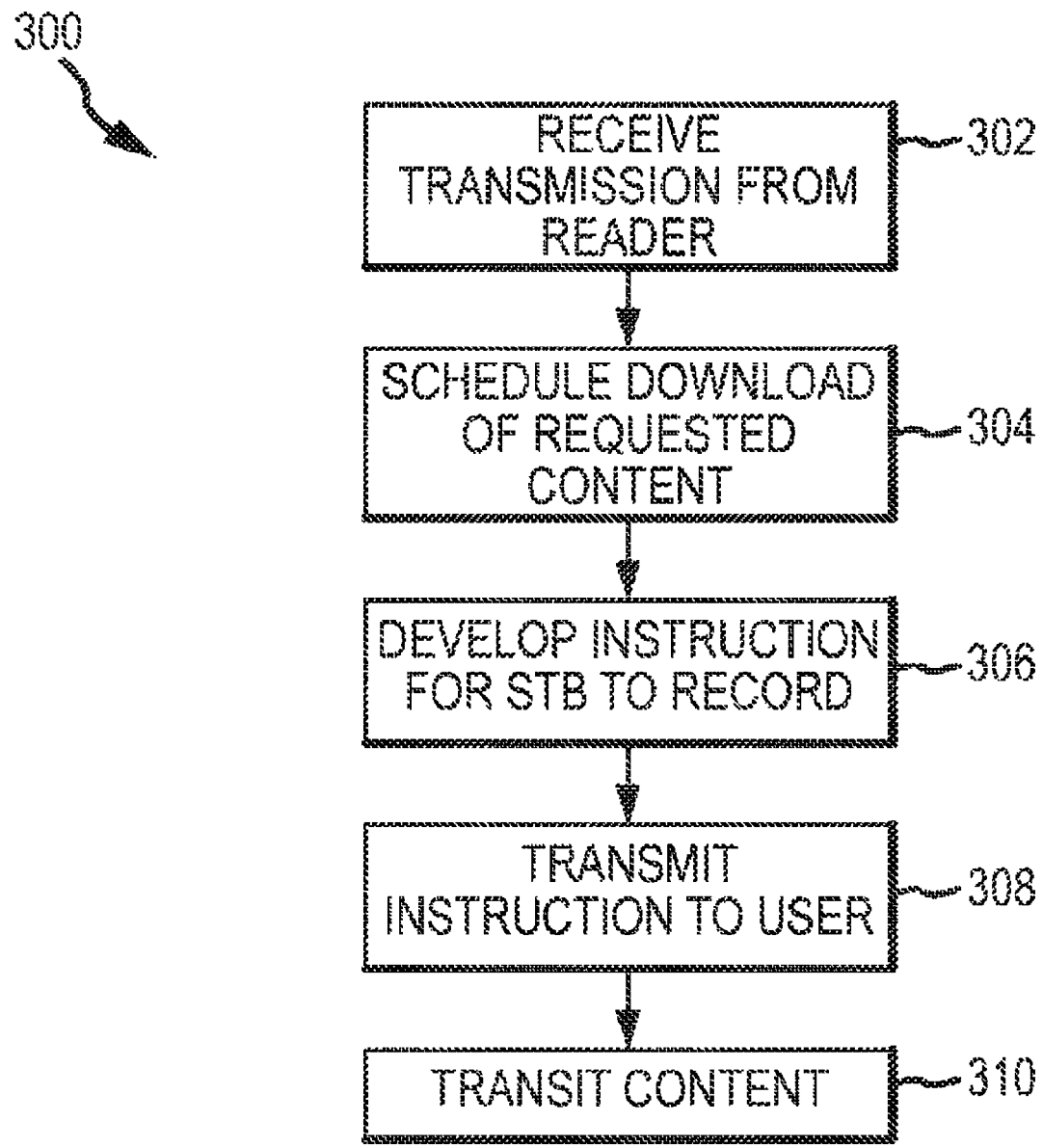
FIG. 3 is a flow chart illustrating a method for remotely controlling a set top box.
Figure 4:
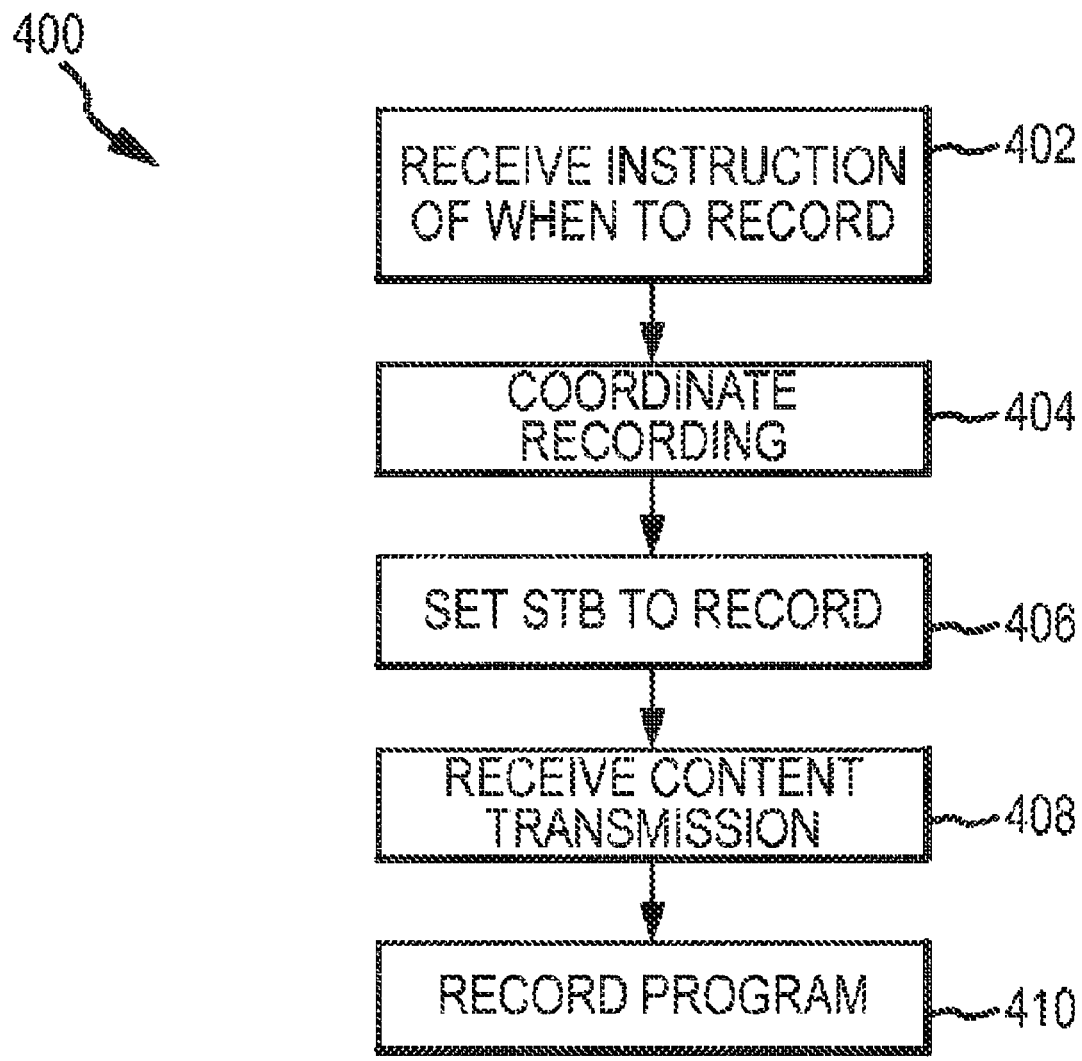
FIG. 4 is a flow chart illustrating a method for setting a recording time on a set top box.

Having described a system 100 upon which the current methods may be performed, reference is now made to FIGS. 2-4, which each illustrate a portion of a process for using matrix codes displayed in programming content to express interest in or purchase a remotely accessible program, such as an on-demand program. For example, programming content in the form of an advertisement or television commercial may be embedded in a television program and the advertisement may relate to a movie, for example, that is available via an on-demand service provided by the television service provider. A viewer of the advertisement may scan the matrix code in the advertisement with a smartphone, for example, and the smartphone may communicate via a network to the service provider that the user is interested in the advertised movie via the on-demand system. Accordingly, the television service provider may schedule the movie to be downloaded to the user's set top box. As such, the next time the user accesses the on-demand features of his system, the advertised movie may be available for them to purchase and watch in an on demand manner. The method 200 of FIG. 2A or the method 250 shown in FIG. 2B may perform part of this larger process by generating a matrix code containing information regarding an on-demand program and displaying it in an advertisement. FIGS. 3 and 4 may relate to the responsive processes of scheduling and downloading the video.

Before discussing the operations performed in the method, additional information is provided with regard to the programming content, the matrix codes included therein, and the information in the matrix codes. The programming content may be in the form of commercials embedded in a television program or placed in spaces within a television program that interrupt programming. Other programming content may include banner ads that scroll or otherwise appear at a bottom, top, side, or corner of a screen, for example, during programming or while viewing a program guide, menu, or other display available from a service provider. That is, the program guide, for example, may be designed to stream advertisements while a viewer is reviewing or scrolling through the guide. Other menus, such as time-shifted program menus, on-demand menus, or others may also be designed to stream advertisements while a viewer is viewing the menu. Still other advertisements may include standing or intermittent logos present during programming, on the program guide, menu, or other display. Still other advertisements may include pop up ads appearing to the viewer.

The programming content may include a matrix code, such as a QR code, that is presented to the user for viewing and/or capturing, such as scanning with a reader 106. The matrix code may be visible throughout the advertisement or it may appear for a portion thereof. In some embodiments, a prompt may be incorporated into the advertisement indicating when the matrix code will appear so that a viewer may be ready to scan the code. The prompt may suggest that additional information about the advertised program may be available or the prompt may indicate that scanning the code may make the program available in the user's on-demand menu. In systems where on-demand programs require purchase, the prompt may suggest that scanning the code will make the program available in an on-demand menu for later purchase, while other embodiments may suggest that scanning the code will cause the program to be purchased. In the latter embodiment, controls may be put in place on the user's account for verifying the smartphone or other reader 106 that is scanning the code to prevent third party viewers from purchasing programs and charging the account holder.

An exemplary matrix code 140, as depicted in FIG. 1, is a two-dimensional display (such as a QR code) defining patterns and regions that embody data, similar to a bar code. The matrix code 140 may take the form of alternating black and white elements, such as squares or other geometric shapes. The two-dimensional nature of the display may generally allow for more data to be stored than a typical bar code. While the present disclosure is related to the use of two-dimensional matrix codes 140, other data storing/displaying images or systems may also be used. For example, holographic images allowing for three-dimensional storage of data may be used, as may changing images that allow for recording and/or display of information over time. Each of these and other methods for storing information in a display may be used and are considered to be included in the term "matrix code" 140.

The matrix codes 140 in the present embodiment may store advertisement data and/or identifying data. The advertisement data may relate to the content of the advertised movie or on-demand program, while the identifying data may pertain to, for example, the title of the on-demand program in addition to the account information of the user. The advertisement data may, for example, include a Uniform Resource Locator (URL) allowing the reader 106 to access a corresponding website via the Internet 108. The website may include additional information regarding the on-demand program. For example, the additional information may include movie trailers, additional advertisements, related products, games, coupons, or other information or incentives relating to the advertised on-demand program. Unrelated information or products may also be provided. In other embodiments, the advertisement data may include executable code that, when processed by the reader 106, causes the reader 106 to execute the program and perform an activity. For example, the executable code may run an advertisement on the reader 106 that is the same or different from the advertisement from which the matrix code was scanned or a movie trailer may be played on the reader. In other embodiments, the scanned code may include a link to download related applications such as games, for example. Other types of advertisement data may be included in the matrix code 140 and may be particularly configured to entice viewers of television to scan the codes when viewing advertisements. The enticement may be by way of additional information, applications, convenience, or other benefits flowing to the viewer who scans the matrix code.

The advertisement data may be supplied by the advertiser. For example, a producer of a movie may develop, or have developed, an advertisement for its movie. At the time of developing the advertisement, a matrix code 140 and any associated prompts, highlights, or other features to encourage viewers to scan the matrix code 140 may be included in the advertisement. When a network or other program providing entity assembles programming they may include the advertisement in their programming. Accordingly, the receiver in the system above may receive the advertisement together with the program or other audiovisual content being provided by the broadcasting network. In other embodiments, a television service provider such as a satellite or cable provider may coordinate the inclusion of advertisements in a program or in a program guide or other menu. Without more, the advertisement may run with the program or menu and, if scanned by a viewer, the advertisement data may be decoded and actions may be taken by the reader 106 according to the advertisement data.

In other embodiments, the advertisement data may be pre-supplied to the receiver 102, which in turn may generate a matrix code to be displayed with the advertisement. That is, the receiver 102 may include advertisement data corresponding to a list of known advertisers stored in the computer readable storage medium 126. For example, the receiver 102 may have a URL address stored in a database and associated with a corresponding advertiser. When the receiver 102 receives a signal that includes advertisements for the advertiser, the receiver 102 may overlay the particular advertisement with a matrix code 140. The matrix code 140 may include the stored advertisement data, such as the URL address. Thus, where advertisers have not supplied their own matrix codes 140 with advertisement data, the receiver 102 may be capable of doing so. In still other embodiments, the matrix code 140 with advertisement data may be provided by a television network or a satellite service, cable service, or other television service provider.

As indicated, the matrix code 140 presented on the presentation device 104 may also include identifying data in addition to the advertisement data. The identifying data may include information about the account holder such as an account number and a set top box identifier such as a serial number, access card number, or other box identifying information. The identifying data may also include a movie title or other identifying information about the on-demand movie, program, show, or other audiovisual content. That is, in addition to the title, other identifying information may include the type of content such as movie or television show or series, movie genre, or other category information to assist the on-demand provider with identifying the correct on-demand program. In some cases, the identifying data may also include whether the user has expressed interest in an on-demand program or whether they have authorized the purchase of the program.

The identifying data may also include instructions to be performed by the reader 106 to allow the identifying data to be communicated to the television provider for scheduling and downloading of the on-demand content. For example, the identifying data may include instructions for the receiver to generate an e-mail, text, telephone call, or other transmission to transmit the identifying data to a server 110 having processing instructions stored thereon. Other instructions included in the identifying data may include URL information for the reader 106 to access the Internet and provide the identifying information to a server 110 via a website or other network interface.

The identifying data may be supplied by the receiver 102 and may be stored in the computer readable storage medium 126 thereof. The receiver 102 may be associated with a television service provider such as a satellite or cable provider. Accordingly, the receiver 102 may have information stored therein about the associated account holder and/or its location and may further include information regarding the particular set top box being used, such as a serial number, access card number, or other distinguishing box information. This identifying data may be stored in a computer readable storage medium 126 within the box 116 and be available for including in the matrix code. The identifying data relating to the on-demand program may be taken from the advertisement data by the receiver 102. For example, when an incoming advertisement includes a matrix code with advertisement data, the receiver 102 may read the matrix code and pull the title of the on-demand program from the provided matrix code. In other embodiments, for example, when a television service provider is inserting advertisements into spaces within programs, the service provider may tag particular ads with identifying information allowing the receiver 102 to read and store the information as identifying data for use in a matrix code.

The receiver 102 may generate and insert a matrix code 140 in an advertisement that does not already have a matrix code or the matrix code 140 of an advertisement already having a matrix code 140. When the matrix code 140 is not already provided, the receiver 102 may analyze the incoming stream and read, for example, movie titles associated with commercials and other identifying data from metadata in the stream, data on the storage medium, and the like. The receiver 102 may then generate a matrix code 140 and insert it, together with any prompts or other information, concurrently with the advertisement. This may include providing a banner along the bottom, top, side, or corner of a display during the advertisement that displays the matrix code and, optionally, further instructs the viewer to scan the code with, for example, their smartphone. When the matrix code 140 is already provided in an advertisement, the receiver 102 may modify or replace the matrix code 140 such that it may include the identifying data. This may involve modification of the matrix code 140 such that the advertisement data in the code 140 remains and the identifying data is read from the computer readable storage medium 126 and added to the matrix code 140. The modified matrix code 140 may then be shown in place of the originally provided matrix code 140. In some embodiments, the receiver 102 may read the matrix code 140 and create a new matrix code 140 including the advertisement data provided by the advertisers matrix code 140 and the identifying data provided by the receiver 102. The receiver 102 may then overlay the new matrix code 140 over the advertiser supplied matrix code 140 for display to the viewer. This latter approach may allow a television service provider to exercise more control over the appearance and capability of matrix codes 140 displayed by their service. This may allow for proprietary forms of matrix codes 140 to be used by several television service providers.

In each of the above cases when a matrix code 140 is provided and is modified, or when a matrix code 140 is absent and is produced, the receiver 102 may rely on matrix code software stored therein. The software may include a matrix code development module for developing matrix codes and incorporating data therein. The software may further include a matrix code decoding software for decoding matrix codes already present in a program. The software may also include a matrix code editing module for modifying or editing matrix codes 140 to add or remove data therefrom.

With this background regarding programming content, matrix codes, and the data stored therein, the methods 200 and 250 may be described in more detail. The methods 200 and 250 may be performed by all or a portion of the system 100 of FIG. 1. The method may also be performed by other systems.

Referring to FIG. 2A, the receiver 102 may receive a signal carrying one or more matrix codes associated with an identifier (202). For example, a service provider may pre-assemble a plurality of matrix codes 140 and associate them with identifiers. The matrix codes 140 and identifiers may be stored in a database. The operation depicted in box 202 may involve receiving a data transmission including the data in the database from a service provider. In one embodiment, for example, each of the matrix codes 140 may relate to or contain identifying data of an on-demand movie title and each code may be associated with a particular identifier. The codes 140 may have additional identifying data and may also include advertiser data as described above. Having received the one or more matrix codes 140 associated with an identifier, the receiver 102 may store the codes 140 and identifiers in a computer readable storage medium 126. This process of receiving data including matrix codes 140 and identifiers may occur on an ongoing basis where the stored data is continually updated, or the process may occur periodically, such as overnight for example. Either way, the process may be intended to continually prepare the set top box 116, for example, to receive programming content carrying instructions to retrieve the stored matrix codes 140.

With continued reference to FIG. 2A, the receiver 102 may receive a signal carrying programming content (206), such as a television advertisement, for example. The signal carrying the programming content may include a data stream, a video stream, and an audio stream. In the data stream, or otherwise, the programming content may include instructions for the receiver 102 to retrieve a particular matrix code 140 in addition to instructions on what to do with the matrix code 140. For example, the data stream of the programming content may instruct the receiver 102 to retrieve a particular matrix code 140 by providing a particular identifier to the receiver 102 and instructing the receiver to retrieve the associated matrix code 140. The programming content may further include instructions on how, when, and where to display the matrix code. For example, when the programming content is a 30 second television commercial, the instruction may direct the receiver to display the retrieved matrix code in 20 seconds lasting for 10 seconds thereby presenting the matrix code for the last 10 seconds of the television commercial. In other cases, the instruction may direct the receiver 102 to display the code 140 immediately and throughout the length of the commercial. In still other embodiments, the instructions may direct the receiver 102 to display the code 140 at the beginning and end of the commercial. In addition to temporal instructions, the instruction may also indicate where on the screen to display the matrix code 140 so as to suitably appear within the programming content. In some embodiments, the instruction may include directing the receiver 102 to display a prompt or other pop-up for encouraging or enticing a user to capture the matrix code 140 with a reader 106.

Having received the instruction from the data stream or other portion of the programming content, the receiver 102 may retrieve the designated matrix code (210). Where the instructions include an identifier, for example, the receiver 102 may search the stored matrix codes 140 and identifiers and retrieve the matrix code 140 associated with the identifier matching that provided by the programming content. Having retrieved the matrix code 140, the receiver 102 may then follow the additional instructions provided by the programming content to output the matrix code 140 and/or other content to the presentation device (212). The preloaded matrix codes 140 and identifiers may allow the receiver 102 to react in real time to incoming programming content allowing matrix codes 140 to be included in programming content without delay, interruption, or loss of content. As is described with respect to FIGS. 3 and 4 below, the matrix code 140 may be captured by a user and the identifying data from the code 140 may be communicated to a service provider including instructions to download a particular on-demand program, for example, to a user's set top box for the option to purchase the on-demand program.

Turning now to the embodiment shown in FIG. 2B, the receiver 102 may receive a signal carrying a programming content (252), such as an advertisement, for example. The received signal, like operation (206) above, may be any programming content signal and may have advertisements, or spaces for advertisements, incorporated therein. For example, the signal may be a television broadcast signal carrying a live program or it may be a signal carrying a program guide or other menu. As such, the signal received by the receiver 102 may include several forms and may be carrying at least one of several types of audiovisual content.

Having received a signal carrying programming content (252), the receiver 102 may temporarily store the content (254) in a computer readable storage medium 126 and may further search the advertisement for a matrix code (256). Depending on whether an initial matrix code is present, the receiver may generate a matrix code 140, or choose not to, by performing differing operations (258). For example, when an initial matrix code is present, the receiver 102 may generate a matrix code 140 by first utilizing a decoding software module stored on the storage medium to decode and read the initial matrix code. The receiver 102 may analyze the read data to determine if the advertisement relates to an on-demand program. This may occur by comparing a program title found in the initial matrix code to a database of on-demand programs available from a television service provider. If the advertisement relates to an on-demand program, the receiver 102 may then rely on an editing software module to generate a matrix code 140 by modifying the initial matrix code to include identifying data (260). Once modified, the advertisement with the modified matrix code 140 may be temporarily stored (264) as a revised advertisement.

In another example, when an initial matrix code is not present, the receiver 102 may process any associated, tagged, or other information defining the nature of the advertisement. That is, without a matrix code in the advertisement, other options may be used to determine the nature of the advertisement and further determine, for example, if it relates to a movie or other program and the title of the program. Such information may be obtained from advertisement metadata, for example. When a program title is identified, the title may be compared to, for example, a database of on-demand programs available from a television service provider. If the advertisement relates to an on-demand program, the receiver may generate a matrix code 140. In this example, the receiver 102 may also provide advertisement data by searching a database associated with receiver 102 or accessed via a network such as the Internet for advertisement data consistent with the advertisement in the broadcast. For example, the receiver 102 may obtain a Web address for a producer of a movie advertised in the advertisement. The receiver 102 may then rely on a matrix code development module to produce a matrix code 140 including both the searched for advertisement data and the identifying data (262). Once the matrix code 140 is compiled, it may be associated with the advertisement and the advertisement may be temporarily stored as a revised advertisement (264). In both of the above cases, the advertisement with the generated matrix code may then be output to the presentation device (266).

Once a program including matrix codes 140 has been output to a presentation device 104, a viewer may scan a matrix code when it is presented on the presentation device 104. The matrix code 140 may have advertisement data and/or identifying data stored therein. The viewer may direct the optical receiver portion of a reader 106 toward the presentation device 104 when the presentation device 104 is displaying a matrix code 140. The viewer may then actuate the optical receiver by, for example, depressing a shutter button. The reader 106 may thus capture an image of the matrix code 140. In some embodiments, the viewer may zoom, focus, or otherwise direct the reader toward the portion of the presentation device displaying the matrix code.

As mentioned above, the reader 106 may include an auto run feature causing the reader 106 to begin the decoding process when a matrix code 140 has been captured. In other cases, the viewer may deliberately select software resident on the reader 106 and direct the software to decode the captured image of the matrix code 140. The software may decode the image thus producing the advertisement data and the identifying data. Depending on the nature of the data, the processor may automatically follow instructions provided by the advertisement and/or identifying data. For example, when the reader 106 has Internet connectivity, the advertisement data may include instructions for the processor to launch a web browser and browse to a particular URL address causing a website with information relating to the advertisement to appear on a display of the reader 106. The viewer may then view the website and interact with the website as desired. The identifying data may include instructions for the processor to compile and send an e-mail, text, or other communication to an on-demand server for requesting the on-demand program advertised. The communication may be received by the on-demand server and the identifying data contained in the communication may be used to schedule and download the advertised on-demand program to the set top box of the user.

Referring now to FIG. 3, a method for scheduling and downloading a requested on-demand program is shown. It is noted that on-demand programming often occurs by storing several programs locally in the computer readable storage medium of a user's set top box. As such, once selected, paid for, or otherwise receiving authorization, the user may have the program streamed from their set top box to their presentation device. The locally stored nature of the data allows the program to be played immediately, without downloading, and avoids buffering and other difficulties with data streaming over wider networks. However, set top boxes may have a limited amount of storage and while a television provider may have access to large numbers of movies and other on-demand programs, they may not be able to make them all available via an on-demand service due to lack of storage space available on users' set top boxes. Accordingly, in some circumstances, television service providers periodically review the on-demand selections available on users' set top boxes and update the available selections. This commonly occurs during overnight hours and involves deleting old selections from the set top box and downloading new ones to the set top box. In this manner, a television service provider may keep the on-demand options available to its users fresh and new while also making a wider range of selections available than the set top box is capable of storing at a given time.

Operations described herein may allow a television service provider to tailor the selections available in a user's on-demand menu by receiving expressions of interest from the user. Accordingly, and turning again to FIG. 3, the server or other system 110 of the television service provider may receive a transmission (302) from the reader 106. The transmission, as suggested by the method 200 and the subsequent discussion regarding the reader 106 scanning the matrix code, may include identifying data regarding a user and an on-demand program the user may be interested in or has chosen to purchase. The server 110 may thus search the on-demand programs stored in a database to locate the associated on-demand program. The server 110 may then schedule a time to send a signal (304) to the user's receiver 102 for storing the program in the user's computer readable storage medium 126 and reflecting the availability of the program in the user's on-demand menu. It is noted that the scheduled time may be immediate or it may be delayed and schedule for overnight hours, for example. Other times may be selected depending on the practices of the television service provider, the expectations of the user, and other factors. The server 110 may also select a channel, frequency, or other band defining mode for sending the signal to the set top box 116. In addition, the server 110 may develop an instruction (306) for the user's set top box 116 to schedule a recording at the corresponding time and on a corresponding channel. Alternatively, to provide the server 110 with flexibility regarding when to send the signal, the instruction to the set top box 116 may be more flexible and may, instead include instructions for the set top box 116 to watch for an incoming signal having the on-demand content and to record the content when the signal is transmitted. Once the instruction is developed, the server 110 may transmit the instruction (308) to the user's receiver 102. The server may then transmit the content (310) to the user for recording by the receiver 102 at the scheduled time or, when the receiver 102 can be flexible as to the time of the transmission, the server 110 may transmit the content when it is convenient, feasible, or efficient. In some embodiments, the transmission of the instruction to schedule a recording (308) and the transmission of the content (310) may occur substantially simultaneously. That is, the instruction to record may be sent (308) and may be immediately followed by the transmission of the content. (310) In still other embodiments, the transmission (310) and the recording (308) may occur in segments.

Referring now to FIG. 4, a user's receiver 102 may receive the instruction (402) from the television service provider's server and the receiver 102 may set itself to record (406) based on the instruction. As indicated, this may include setting the set top box 116 to record a particular channel at a particular time. In some embodiments, the set top box 116 may coordinate the recording (404) by conducting a recording conflict check. That is, the set top box 116 may include a plurality of scheduled recordings based on the user's preferences for television programming. In this embodiment, the set top box 116 may review whether it has other programs scheduled for recording at the time instructed by the server 110. Where conflicts are found, the set top box 116 may communicate via phone line, Internet, or other network connection that this time conflicts with other recordings and the time may thus be adjusted and coordinated to avoid missing a planned recording. In still other embodiments, where a conflict is found, a pop-up may be presented to a user on the presentation device 104 that indicates that a scheduled on-demand download is in conflict with a scheduled recording and the user may choose to cancel the on-demand download or cancel the previously scheduled recording. In still other embodiments, the user may be provided with the option to instruct rescheduling of the on-demand download. In still other embodiments, the prompt to the user on the display device may include presenting a matrix code 140 having the conflict information allowing the user to scan the code 140 for communicating to the service provider. The receiver 102 may then receive a transmission (408) from the server 110 of the television service provider including the on-demand content and the receiver 102 may record (410) or otherwise store the content in the computer readable storage medium 126. The set top box 116 may also update the on-demand menu to reflect the availability of the newly recorded on-demand program.

This overall process including the method for generating a matrix code 200, the method for scheduling and downloading an on-demand program 300, and the method for coordinating and recording the on-demand program 400 may be advantageous for several reasons. For example, the process may allow a television service provider to make on-demand programs available to a user that the provider is substantially certain the user is interested in. Moreover, the provider may further monitor the expressions of interest from their users and may be better equipped to tailor the on-demand selections available to the user beyond programs where a specific expression of interest was provided. That is, where a user expresses an interest in a program by scanning a matrix code in an advertisement for an action film, for example, the provider may weight that user's on-demand selections more toward action films. Other profiling techniques may be used to attempt to tailor users' on-demand menus to their particular interests.

Figure 5:
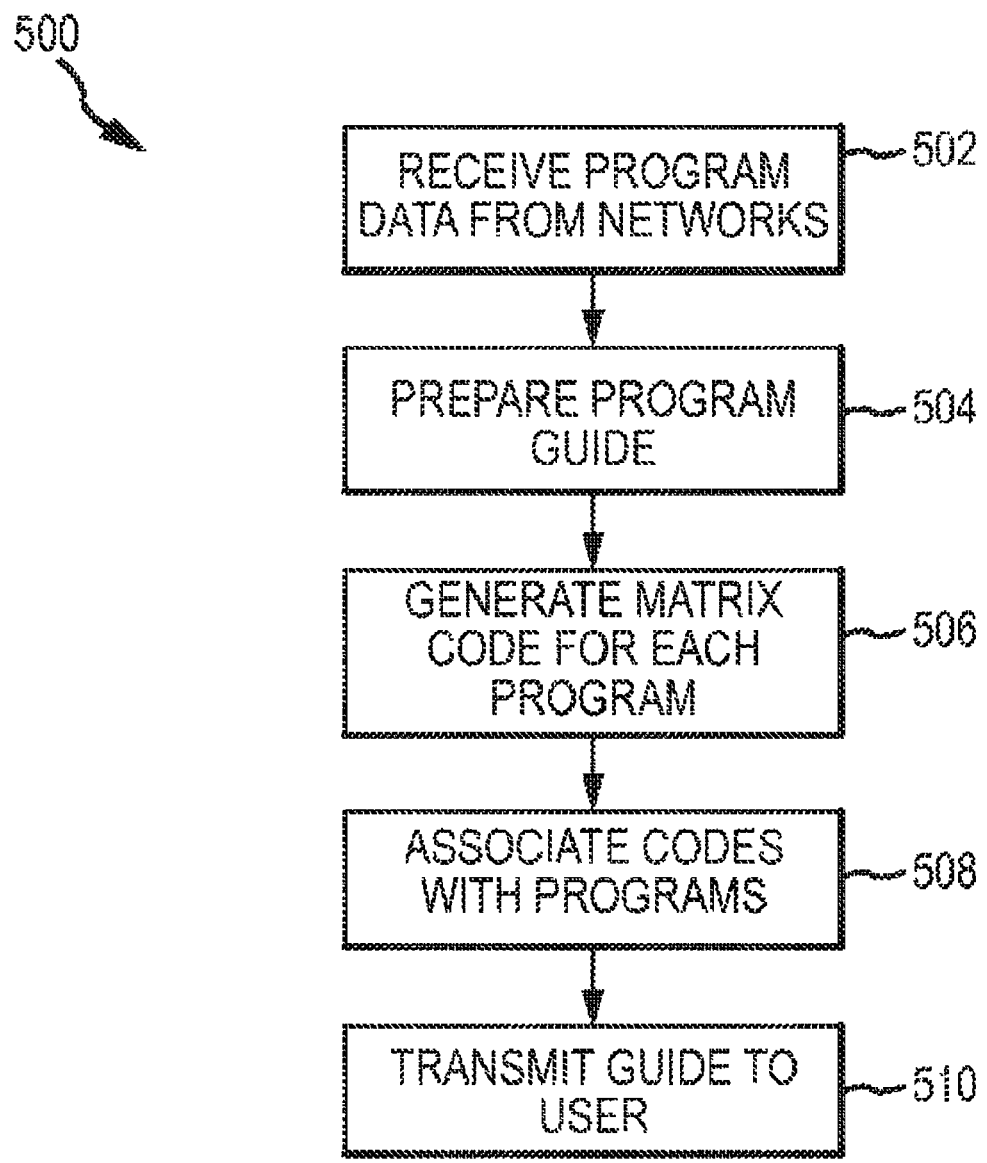
FIG. 5 is a flow chart illustrating a method for preparing a program guide.
Figure 6:
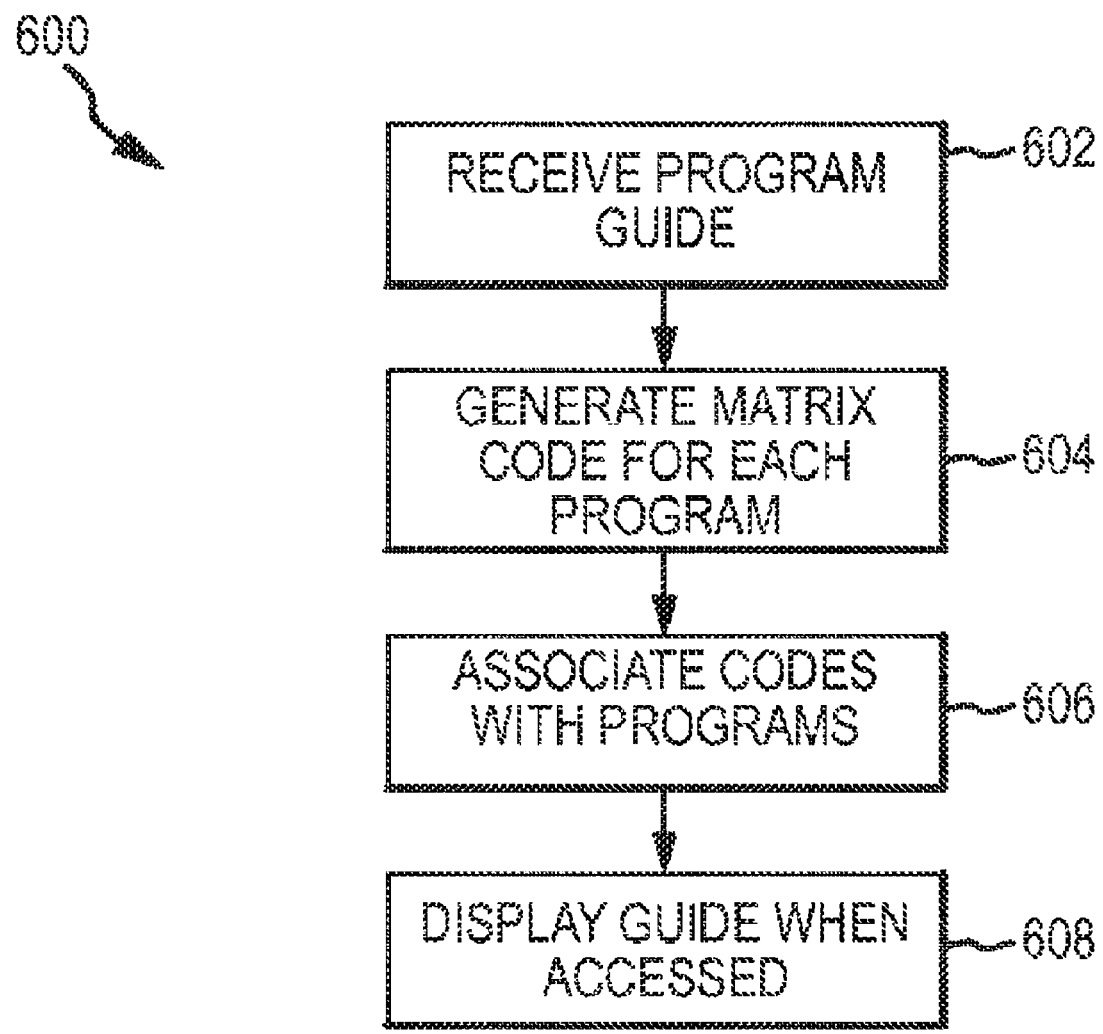
FIG. 6 is a flow chart illustrating a method for receiving and updating a program guide.

Turning now to FIGS. 5 and 6, another embodiment of a method for communicating upstream to modify or change content available to a user is shown. The methods shown in FIGS. 5 and 6 may be part of a larger process using matrix codes appearing in an electronic programming guide. This process may include a television service provider preparing the program guide, generating matrix codes relating to the programs in the guide, and associating the codes with the programs in the guide as shown in method 500 of FIG. 5. The program guide containing the matrix codes may then be transmitted to a user. In some embodiments, the matrix codes 140 may be provided by a set top box 116 rather than by the television service provider, as shown in FIG. 6. In either case, the matrix codes 140 within the program guide may be scanned by a reader 106 and information stored therein may be transmitted to the service provider by the reader. Methods similar to those described with respect to FIGS. 3 and 4 may also be used as part of this larger process to control the content available to a user. In one embodiment, for example, the matrix code produce by method 500 or 600 may include identifying data relating to the program and instructions to record the program on an ongoing basis. The reader 106 may scan the code and communicate the instruction to the service provider. The service provider, similar to the operations shown in FIG. 3, may develop an instruction to record and transmit the instruction to a user's set top box 116. Similar to FIG. 4, the set top box may receive the instruction, conduct any coordination, and record the program.

With particular reference to FIG. 5, a method 500 for preparing a program guide is shown. As shown, a television service provider may receive program data from one or more networks (502). The program data may include program titles, the date and time of the scheduled airing of the program, and any other descriptive information regarding the program. The service provider may compile the several programs and create an electronic program guide (504) reflecting the several channels that may be available to its users and the programs that may be available on each respective channel at particular times.

The service provider may generate a matrix code 140 for each program within the guide (506). The matrix code 140 may be generated with matrix code development software and configured to store several types of information. In this embodiment, the matrix code may include program data such as the name of the television program or other identifier and the date, time, and channel that the television program is scheduled to air. The program data may include descriptive information regarding the program and the particular episode that is scheduled to air. In addition, the program data may include URL links to network web sites offering episode selection, products, or other information relating to the program. Other program data may also be included.

The matrix code 140 generated may also include instructions. For example, the matrix code 140 may be intended to allow a user to schedule recording of the program or series of programs associated with the matrix code 140. In other embodiments, it may be intended for allowing storage of the information about the program for sharing with others. In still other embodiments, the matrix code 140 may be intended to display the information on a reader 106 or execute a program on the reader 106 or access a website. As such, the matrix code 140 may include one or more instructions that instructs the reader 106 on how to proceed having scanned the matrix code 140.

The matrix code 140 having the program data may be associated with its respective television program (508) and arranged in a manner to reflect association therewith. For example, the matrix code may be placed just behind or just in front of the program title in the menu. In other embodiments, the program guide may be configured to reveal additional information about the program when selected by a user with, for example, their remote control. In this embodiment, the matrix code 140 may not appear in the general guide, but may appear when additional information is revealed after selection by the user. In other embodiments, the matrix code 140 may be available in both the general menu and in a more detailed view. The prepared program guide may then be transmitted to the user (510). The transmission may include periodic transmissions allowing the program to be updated with additional programs and information and to reflect changes in programming.

Referring to FIG. 6, a method of displaying the program guide 600 may be provided. In this embodiment, a receiver 102 may receive the program guide (602) from the service provider transmission. In this embodiment, for example, where the program guide includes matrix codes 140 having program data, the receiver may generate a matrix code for each program (604), by updating the already present codes 140 with user information. That is, for example, the receiver 102 may read account information and/or set top box data such as a serial number or access card data from one or more computer readable storage media contained therein. The receiver may include matrix code software for reading, editing, and/or creating matrix codes, and the receiver may modify the matrix code 140 already present in the guide to include information specific to the user. As such, the resulting matrix codes 140 may be associated with particular programs and may include program data, instructions, and user information. This step of updating the matrix codes 140 with the user information may occur each time an updated program guide is transmitted by the service provider (510) and received by the receiver (602). The set top box 116 may then display the guide (608) when instructed to do so by a user. For example, the user may instruct the set top box 116 to display the guide using a remote control or control on the set top box 116.

In other embodiments of the method 600, for example, the service provider may compile the program guide, but may not provide the matrix codes 140. In this embodiment, the receiver 102 may be configured to generate matrix codes (604) by creating them. In this embodiment, the generation of the matrix codes 140 may be more involved than that described above. That is, rather than updating the matrix codes 140 with user information, the present embodiment may include creating matrix codes 140 that include program data, instructions, and user information. In this embodiment, the receiver 102 may receive the program guide (602). The receiver 102 may then read the program guide information from the program guide and develop and store program data. The receiver 102 may have instructions for what a reader 106, for example, should do with the code data stored therein. In addition, as above, the receiver may have account information and/or set top box information also stored therein. Accordingly, having read the program guide information, the receiver 102 may generate a matrix code (604) for each program in the guide including program data, instructions, and user information. The receiver 102 may also associate each matrix code (606) with its respective program and arrange the matrix code 140 visually within the guide to appear associated with the program. Each time an updated program guide is received from the service provider or at some interval thereof, the receiver 102 may generate the matrix codes (604) and associate them with the programs (606) in the guide. As with the above embodiment, the set top box 116 may display the guide (608) when instructed to do so by a user.

In either of the above embodiments, a user may scan a matrix code within the program guide with a reader 106. As with previous embodiments, the reader 106 may store the data and may require action by the user to do something with the read data or the reader 106 may include an auto run feature allowing the code 140 to be automatically decoded, for example. In some embodiments, the data read by the reader 106 may be stored therein and may be viewable on the reader 106. In some embodiments, the stored data, particularly the program data portion thereof, may be sent via text or data message or e-mailed to a friend along with comments about the show. For example, where a user want to notify a friend of an upcoming showing of a program, they may do so by scanning the matrix code 140 from their program guide and communicating the program data to the friend.

In other embodiments, the instruction portion of the data stored in the matrix code 140 may include instructions to access a website, send a text message, or otherwise communicate to the service provider an interest in recording the show in the guide. Where the service provider receives such a transmission, the methods 300 and 400 may be used to schedule the user's set top box 116 to record. However, the aspect of method 300 relating to scheduling the download may be omitted. That is, if the program is present in a program guide, the date, time, and channel of the airing may already be scheduled. As such, the aspect of method 300 regarding developing an instruction and transmitting an instruction to the user may be used. The several operations of method 400 may be used to receive the instruction, coordinate the instruction, set the box 116 to record, and record the showing.

In still other embodiments, the instruction portion of the data stored in the matrix code 140 may be to access a website for example available via the program data. In this embodiment, for example, the reader may access a URL address associated with the program and available in the program data portion of the matrix code 140. The reader 106 may connect to the Internet, navigate to the URL address, and allow the user to interact with the website. The user may, for example, select online episodes to view, watch trailers, or otherwise interact with a website featuring the respective television program.

In still other embodiments, a combination of the above processes for scanning and using the matrix code 140 data may be provided. Likewise, multiple matrix codes 140 may be provided for each program depending on the intended use of the information in the matrix code 140. For example, one matrix code 140 may be used if the user would like to set their set top box 116 to record just the shown episode. Another matrix code 140 may be used if the user would like to set their set top box 116 to record a series. Still a further matrix code 140 may be provided if the user would just like to receive additional information about the program, for example. In other embodiments, the instruction portion of the code data may include instructions to prompt the user with a question of their intention. As such, once scanned with a reader 106, the user may be prompted with a question such as, "Just this episode or entire series?" The user's response to the prompt may be included in the communication to the service provider allowing the service provider to develop a suitable instruction for sending to the user's set top box 116. In still other embodiments, the multiple matrix codes 140 may include data relating to how many episodes to save and for how long to save the episodes. Other common questions regarding recording television programs may be avoided by having matrix codes 140 configured to cause recording in a certain manner. In other embodiments, the user may be able to control the type of matrix codes available for scanning by selecting from setup options available on their set top box 116.

The methods 500 and 600 relating to generating matrix codes for an electronic programming guide may be advantageous for several reasons. For example, the availability of a matrix code 140 in the program guide may make it convenient for a user to set their set top box to record. This may be particularly true where multiple programs are being recorded. Additional advantages associated with allowing for additional information or sharing with friends may also be realized.

It is noted here that while matrix codes in advertisements have been described as being configured for expressing interest in on-demand programming, other uses may also be available. That is, a matrix code in an advertisement for an upcoming television show may allow for scanning thereof, communication to a service provider, and recording of the show or series. Similarly, a matrix code in an advertisement may also be used to express interest in or purchase pay-per-view programs by communicating to the service provider instructions to allow access to a pay-per-view channel where a program may be streamed on a repeating basis. In addition, while matrix codes in the program guide have been described for use with respect to scheduled programming, they may also be used to order or purchase on-demand programming or pay-per-view programming.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM);

erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, comprising:
    transmitting, by a television service provider server, television programming to a television receiver device over a television network;
    receiving, by the television service provider server, a communication from a mobile device, the communication containing identifying data associated with the television receiver device and program information;
    in response to the communication received from the mobile device:
        (a) searching, by the television service provider server, a database to locate a program corresponding to the program information received from the mobile device;
        (b) generating, by the television service provider server, an instruction for the television receiver device to record the program, wherein the instruction corresponds to an instruction for the television receiver device to detect a predetermined signal associated with the program, and to record the program in response to detecting the predetermined signal; and
        (c) transmitting, by the television service provider server, the instruction for the television receiver device to detect the predetermined signal associated with the program and to record the program in response to detecting the predetermined signal, to the television receiver device over the television network;
    after transmitting the instruction to the television receiver device, determining, by the television service provider server, a time to transmit the program to the television receiver device;
    in response to the arrival of the determined time to transmit the program to the television receiver device, transmitting, by the television service provider server, the predetermined signal to the television receiver device at the determined time; and
    transmitting, by the television service provider server, the program to the television receiver device after the transmission of the predetermined signal.

2. The method of claim 1, wherein the program information received from the mobile device includes data identifying an on-demand program.

3. The method of claim 1, wherein the communication received from the mobile device further comprises user account information associated with the television receiver device.

4. The method of claim 1, wherein the program information received from the mobile device includes scheduling information of a program already scheduled for recording by the television receiver device.

5. A television provider server, comprising:
    a first wireless network interface configured to receive wireless signals from one or more mobile devices;
    a second network interface configured to transmit television signals to one or more television receiver devices over a television network;
    one or more processors; and
    memory communicatively coupled with and readable by the one or more processors and having stored therein processor-readable instructions which, when executed by the one or more processors, cause the television provider server to:
        transmit television programming to a television receiver device over the television network;
        receive a communication from a mobile device, the communication containing identifying data associated with the television receiver device and program information;
        in response to the communication received from the mobile device:
            (a) search a database within the television provider server to locate a program corresponding to the program information received from the mobile device;
            (b) generate an instruction for the television receiver device to record the program, wherein the instruction corresponds to an instruction for the television receiver device to detect a predetermined signal associated with the program, and to record the program in response to detecting the predetermined signal; and
            (c) transmit the instruction for the television receiver device to detect the predetermined signal associated with the program and to record the program in response to detecting the predetermined signal, to the television receiver device over the television network;
        after transmitting the instruction to the television receiver device, determine a time to transmit the program to the television receiver device;
        in response to the arrival of the determined time to transmit the program to the television receiver device, transmit the predetermined signal to the television receiver device at the determined time; and
        transmit the program to the television receiver device after the transmission of the predetermined signal.

6. The television provider server of claim 5, the memory having stored therein additional processor-readable instructions which, when executed by the one or more processors, cause the television provider server to:
    determine a time to transmit the instruction to the television receiver device, wherein the determined time is based on a determination of network traffic patterns associated with the television network.

7. A system, comprising:
a television receiver device, comprising:
  one or more processors; and
  memory communicatively coupled with and readable by the one or more processors and having stored therein processor-readable instructions which, when executed by the one or more processors, cause the television receiver device to:
    receive a first signal carrying matrix code data associated with a matrix code stored by the television receiver device; and
    generate the matrix code as part of a content presentation to a presentation device for display;
a mobile device, comprising:
  one or more processors; and
  memory communicatively coupled with and readable by the one or more processors and having stored therein processor-readable instructions which, when executed by the one or more processors, cause the mobile device to:
    scan the matrix code displayed via the presentation device;
    generate a communication to a television provider server based on scanned matrix code; and
    transmit the communication to the television provider server in response to scanning the matrix code; and
the television provider server, comprising:
  one or more processors; and
  memory communicatively coupled with and readable by the one or more processors and having stored therein processor-readable instructions which, when executed by the one or more processors, cause the television provider server to:
    transmit television programming to the television receiver device over a television network;
    receive the communication from the mobile device, the communication containing identifying data associated with the television receiver device and program information;
    in response to receiving the communication from the mobile device:
      (a) search a database within the television provider server to locate a program corresponding to the program information received from the mobile device;
      (b) generate an instruction for the television receiver device to record the program, wherein the instruction corresponds to an instruction for the television receiver device to detect a predetermined signal associated with the program, and to record the program in response to detecting the predetermined signal; and
      (c) transmit the instruction for the television receiver device to detect the predetermined signal associated with the program and to record the program in response to detecting the predetermined signal, to the television receiver device over the television network;
    after transmitting the instruction to the television receiver device, determine a time to transmit the program to the television receiver device;
    in response to the arrival of the determined time to transmit the program to the television receiver device, transmit the predetermined signal to the television receiver device at the determined time; and
    transmit the program to the television receiver device after the transmission of the predetermined signal.

8. The method of claim 1, wherein generating and transmitting the record instruction to the television receiver device comprises:
  determining a delayed time at which to schedule the transmission of the record instruction to the television receiver device; and
  transmitting the record instruction to the television receiver device at the determined delayed time.

9. The method of claim 8, wherein the delayed time at which to schedule the transmission of the record instruction to the television receiver device is determined based on the determined patterns of network traffic over the television network.

10. The method of claim 1, further comprising:
  determining the time to transmit the program to the television receiver device, based on an efficiency calculation for the program transmission;
  after determining the time to transmit the program to the television receiver device, transmitting the signal to the television receiver device at the selected time; and
  transmitting the program to the television receiver device following the transmission of the signal.

11. The method of claim 1, further comprising:
  selecting, by the television service provider server, a channel over which to transmit the signal to the television receiver device; and
  transmitting the signal to the television receiver device over the selected channel.

12. The method of claim 1, further comprising:
  determining a plurality of time slots to transmit segments corresponding to the program, to the television receiver device;
  transmitting a plurality of signals to the television receiver device, wherein each of the plurality of signals is transmitted at the corresponding determined time slot; and
  transmit a single segment of the program to the television receiver device following the transmission of one of the plurality of signals.

13. The television provider server of claim 5, the memory having stored therein additional processor-readable instructions which, when executed by the one or more processors, cause the television provider server to:
  determine a delayed time at which to schedule the transmission of the record instruction to the television receiver device; and
  transmit the record instruction to the television receiver device at the determined delayed time.

14. The television provider server of claim 13, wherein the delayed time at which to schedule the transmission of the record instruction to the television receiver device is determined based on the determined patterns of network traffic over the television network.

15. The television provider server of claim 5, the memory having stored therein additional processor-readable instructions which, when executed by the one or more processors, cause the television provider server to:
  determine the time to transmit the program to the television receiver device, based on an efficiency calculation for the program transmission;

after determining the time to transmit the program to the television receiver device, transmit the signal to the television receiver device at the selected time; and transmit the program to the television receiver device following the transmission of the signal.

16. The television provider server of claim 5, the memory having stored therein additional processor-readable instructions which, when executed by the one or more processors, cause the television provider server to:

select a channel over which to transmit the signal to the television receiver device; and transmit the signal to the television receiver device over the selected channel.

17. The television provider server of claim 5, the memory having stored therein additional processor-readable instructions which, when executed by the one or more processors, cause the television provider server to:

determine a plurality of time slots to transmit segments corresponding to the program, to the television receiver device;

transmit a plurality of signals to the television receiver device, wherein each of the plurality of signals is transmitted at the corresponding determined time slot; and transmit a single segment of the program to the television receiver device following the transmission of one of the plurality of signals.

* * * * *